United States Patent [19]

Hamano et al.

[11] Patent Number: 4,780,006
[45] Date of Patent: Oct. 25, 1988

[54] DOT MATRIX PRINTER

[75] Inventors: Tsutomu Hamano, Odawara; Kunio Numata, Fujisawa, both of Japan

[73] Assignee: NCR Corporation, Dayton, Ohio

[21] Appl. No.: 80,135

[22] Filed: Jul. 30, 1987

[30] Foreign Application Priority Data

Aug. 29, 1986 [JP] Japan ................... 61-201899

[51] Int. Cl.$^4$ .............................................. B41J 3/12
[52] U.S. Cl. ................... 400/121; 101/93.04; 400/76; 400/124
[58] Field of Search ............ 400/61, 62, 76, 121, 400/124; 364/518, 519; 382/46; 340/727; 101/93.04, 93.05

[56] References Cited

U.S. PATENT DOCUMENTS

| | | | |
|---|---|---|---|
| 3,814,227 | 6/1974 | Hurd | 400/121 |
| 4,431,319 | 2/1984 | Karaki et al. | 400/124 |
| 4,521,123 | 6/1985 | Boehmer | 400/124 |
| 4,543,644 | 9/1985 | Kozima et al. | 364/900 |
| 4,655,622 | 4/1987 | Aoki | 340/727 X |
| 4,689,824 | 8/1987 | Mitchell | 340/727 X |
| 4,703,515 | 10/1987 | Baroody | 340/727 X |

FOREIGN PATENT DOCUMENTS

| | | | |
|---|---|---|---|
| 28389 | 2/1983 | Japan | 400/121 |
| 67456 | 4/1983 | Japan | 400/121 |
| 67062 | 4/1984 | Japan | 400/121 |
| 52345 | 3/1985 | Japan | 400/121 |
| 72744 | 4/1985 | Japan | 400/121 |
| 92883 | 5/1985 | Japan | 400/121 |

OTHER PUBLICATIONS

"Printing Throughput Enhancement", by T. E. Schall, IBM Tech. Disc. Bull., vol. 25, No. 8, Jan. 1983, pp. 4098–4099.

Primary Examiner—Paul T. Sewell
Attorney, Agent, or Firm—Wilbert Hawk, Jr.; Albert L. Sessler, Jr.; George J. Muckenthaler

[57] ABSTRACT

In a slip printer, the slip is inserted or placed on the slip table at 90° to normal orientation to accommodate slips which are wider than the print station. Character data and space data are input into memory and printing is done by shifting out character data along with space data on either side of the character in dot by dot manner. A pattern processing section is capable of changing the arrangement of the dot pattern read out from memory, a space data generating section is adapted to output space data signals before and after output of pattern data from the processing section, and a print data buffer stores the process data and the space data for one line dot row prior to printing.

10 Claims, 17 Drawing Sheets

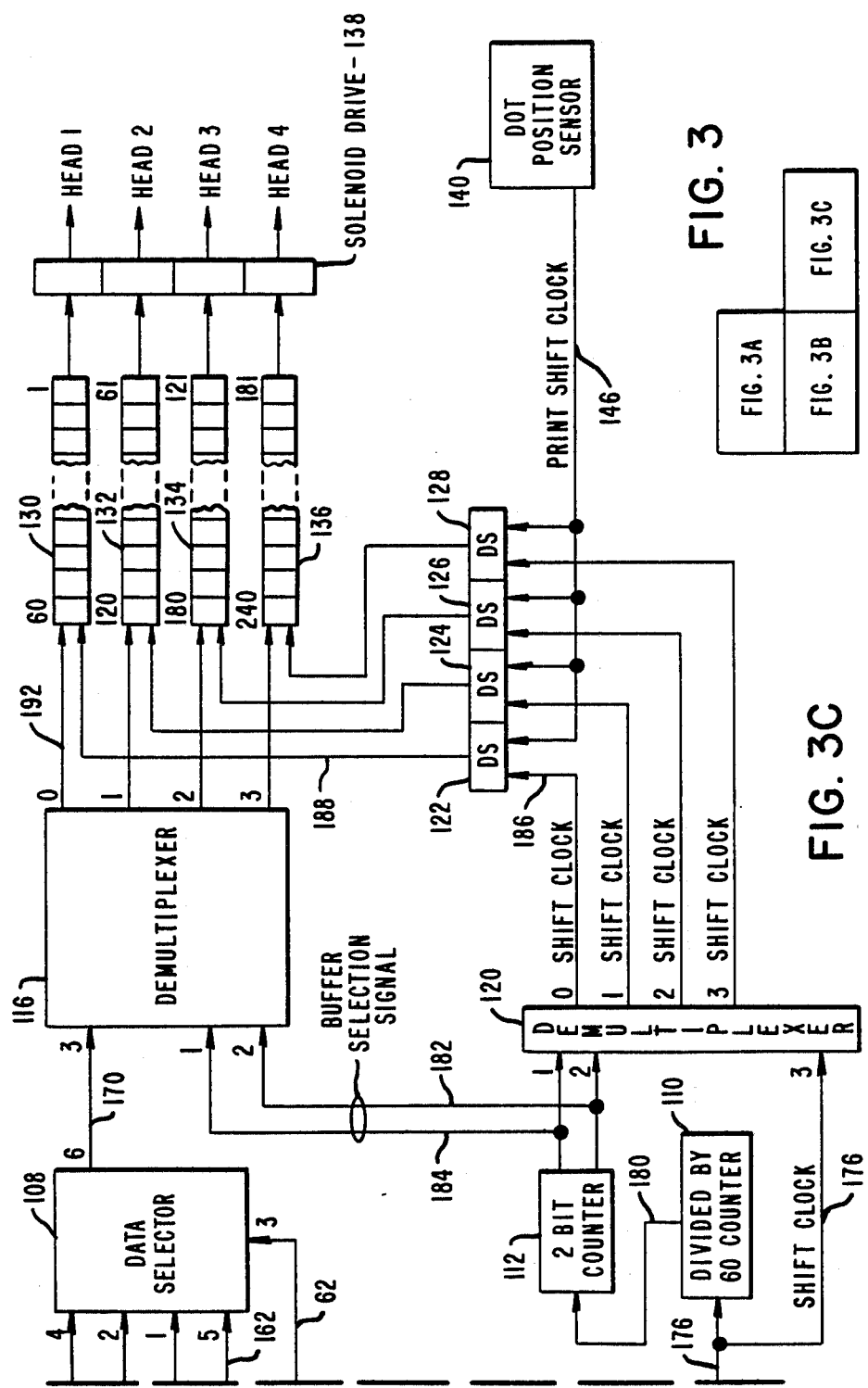

FIG. 6A

|COLUMN|a|b|c|d|e|
|---|---|---|---|---|---|
|ROW 1| |•|•|•| |
|2|•| | | |•|
|3|•| | | |•|
|4|•| | | |•|
|5|•| | | |•|
|6|•| | | |•|
|ROW 7| |•|•|•| |

FIG. 6B

|COLUMN|1|2|3|4|5|6|7|
|---|---|---|---|---|---|---|---|
|ROW (a)| |•|•|•|•|•| |
|(b)|•| | | | | |•|
|(c)|•| | | | | |•|
|(d)|•| | | | | |•|
|ROW (e)| |•|•|•|•|•| |

FIG. 6C

|COLUMN|a|b|c|d|e|f|g|h|i|j|
|---|---|---|---|---|---|---|---|---|---|---|
|ROW 1| | |•|•|•|•|•|•| | |
|2|•|•| | | | | | |•|•|
|3|•|•| | | | | | |•|•|
|4|•|•| | | | | | |•|•|
|5|•|•| | | | | | |•|•|
|6|•|•| | | | | | |•|•|
|ROW 7| | |•|•|•|•|•|•| | |

DOT MATRIX PRINTER

BACKGROUND OF THE INVENTION

In the field of printing, the most common type printer has been the printer which impacts against record media that is caused to be moved past a printing line or line of printing. As is well-known, the impact printing operation depends upon the movement of impact members, such as print hammers or wires or the like, which are typically moved by means of an electromechanical-type drive system and which system enables precise control of the impact members.

In the field of dot matrix printers, it has been quite common to provide a print head which has included therein a plurality of print wire actuators or solenoids arranged or grouped in a manner to drive the respective print wires a very short, precise distance from a rest or non-printing position to an impact or printing position. The print wires are generally either secured to or engaged by the solenoid plunger or armature which is caused to be moved such precise distance when the solenoid coil is energized and wherein the armature or plunger normally operates against the action of a return spring.

It has also been quite common to provide an arrangement or grouping of such solenoids in a circular configuration to take advantage of reduced space available in the manner of locating the print wires in that specific area between the solenoids and the front tip of the print head adjacent the record media. In this respect, the actuating ends of the print wires are positioned in accordance with the circular arrangement and the operating or working ends of the print wires are closely spaced in vertically-aligned manner adjacent the record media. The availability of narrow or compact actuators permits a narrower or smaller print head to be used and thereby reduces the width of the printer because of the reduced clearance at the ends of the print line. The print head can also be made shorter because the narrow actuators can be placed in side-by-side manner closer to the record media for a given amount of wire curvature.

In the wire matrix printer which is utilized for receipt, journal and slip printing operation, the print head structure may be a multiple element type and horizontally disposed with the wire elements aligned in a vertical line and supported on a print head carriage which is caused to be moved or driven in a horizontal direction for printing in line manner across the receipt or journal paper and wherein the drive elements or transducers may be positioned in a circular configuration with the respective wires leading to the front tip of the print head. In the wire matrix printer which is utilized for business forms or like record media printing operation, the print head may be oriented in a manner wherein the nose is pointed downward for printing on the form, slip or record media while the carriage and print head are moved above and across the form or media in the horizontal direction.

Further, the printer structure may be an arrangement which includes a plurality of equally-spaced, horizontally-aligned, single element print heads which are caused to be moved in back and forth manner to print successive lines of dots in making up the lines of characters. In this latter arrangement, the drive elements or transducers are individually supported along a line of printing. Dependent upon the printer type, the horizontally-aligned, single element print heads may be either horizontally or vertically oriented in the axial direction for printing operation. These single wire actuators or solenoids are generally tubular or cylindrically shaped and include a shell which encloses a coil, an armature and a resilient member arranged in manner and form wherein the actuator is operable to cause the print wire to be axially moved a small precise distance in dot matrix printing.

In the case of a wire matrix printer which is utilized for form or multi-copy printing, the difference in thickness of the forms or copies may require some means or mechanism for adjusting the gap or the distance between the print head and the printer platen. It is in the field of printers and more specifically in the field of relatively small sized dot matrix printers for use in electronic cash registers (ECR), point of sale (POS) terminals or like registering-type machines that the subject matter of the present invention is most closely associated, which invention provides for improved and advantageous positioning and control of the slip or form between the print head and the printer platen for the printing operation.

There are requirements for use of the relatively small-sized dot matrix printers such as the slip or form printers that include small print stations having the capability of printing from 20 to 40 characters in the lateral or horizontal direction. These small printers are especially useful for installing or locating in relatively small and/or narrow places on a counter along with other peripheral devices.

While the print station of a conventional slip printer normally can accommodate the size and configuration of a conventional slip or form, there are recent developments in the data processing industry which require different arrangements for printing on other slips or forms. In the case of a conventional slip which is rectangular in shape and wherein such slip is inserted into the printer in the longitudinal direction, the width of the slip station is sufficient to accommodate the slip for printing in successive manner across the narrow dimension of the slip.

However, in association with recent developments of POS systems, the requirement has more frequently arisen that a document which has its long dimension in the horizontal direction such as a check, a slip or a form for credit card usage or the like is to be processed and printed in an ECR or a POS terminal. It is seen that to meet this requirement, it is necessary to enlarge or widen the print station to conform with the longitudinal direction of the slip. This, or course, enlarges the printer and additional space is needed on the counter.

The present invention has been contemplated in order to solve the above-mentioned problem of a larger printer requiring additional space.

Representative documentation in the field of wire matrix print heads includes U.S. Pat. No. 4,431,319, issued to N. Karaki et al. on Feb. 14, 1984, which discloses a serial dot printer for printing the same characters twice with a vertical distance between the first and second printing corresponding to half the vertical pitch of the dots in the first printing.

U.S. Pat. No. 4,521,123, issued to G. Boehmer on June 4, 1985, discloses representation of characters whose strokes comprise a central area, an ascender or a descender. The recording medium is displaced relative to the print element dependent upon the character strokes.

U.S. Pat. No. 4,543,644, issued to Y. Kozima et al. on Sept. 24, 1985, discloses a control circuit for a dot matrix printer that is suitable for various and desirable dot-print patterns.

Japanese Published Patent Specification No. 18989/81 entitled "Character Pattern Generator", discloses means by which dot patterns of turned characters are sequentially produced in single character or one character at a time manner by using a plurality of shift registers and AND gates.

SUMMARY OF THE INVENTION

The present invention relates generally to dot matrix printers for printing on slips or like record media. More particularly, the invention relates to a dot matrix printer having the capability for printing dot patterns that are turned or rotated at least 90 degrees from the normal character dot pattern. A slip or business form or like document is inserted lengthwise into the printer and the printer turns the character and adjusts the spacing between the characters in dot by dot manner. In effect, the printer turns the character, dependent upon the inserted direction of the slip into the printing station, and the spacing between the characters is adjusted one dot at a time.

A character data buffer and a space data buffer store the respective data that is sent from a POS terminal or like apparatus. An edit controller controls associated equipment so as to edit or arrange the dot pattern and dot spacing of a character to be printed based upon a turning signal and other control signals sent from the POS terminal. An address generator is adapted to read the dot pattern data of a character to be printed from a font pattern memory in accordance with signals from the character data buffer and the edit controller. The dot pattern data of each character is stored in the font pattern memory, and the dot pattern data read out of the font pattern memory is processed in a font pattern processor by a control signal sent from the edit controller.

A character and space synthesizer is provided to synthesize or combine the dot pattern of the characters from the font pattern processor with dots indicative of non-character or space portions. The data which is synthesized by the character and space synthesizer is sequentially stored in a print data buffer. A print controller is provided to control a print solenoid driver so as to output data received from the print data buffer for printing operation in accordance with a print shift clock signal from a dot position sensor. A request controller is coupled to the POS terminal to request the sending of the character data and space data therefrom.

In view of the above discussion, a principal object of the present invention is to provide a dot matrix printer with a slip station having the capability of printing characters in the lengthwise direction of the slip by turning the dot pattern of characters to be printed.

Another object of the present invention is to provide a dot matrix printer which can print a dot pattern of characters on a wide slip or along the lengthwise direction of the slip in a conventional width print station.

An additional object of the present invention is to provide a dot matrix printer which turns the dot pattern of the character to be printed and includes control of the space between the character dots.

A further object of the present invention is to provide a dot matrix printer which can freely change the spacing between characters and the width of the characters for printing the characters in turned manner along a line of printing lengthwise of a slip or like record media.

Additional advantages and features of the present invention will become apparent and fully understood from a reading of the following description taken together with the annexed drawing.

BRIEF DESCRIPTION OF THE DRAWING

FIGS. 3A, 3B and 3C, taken together, constitute a block diagram of an embodiment of the line dot printer and include an arrangement utilizing four print heads;

FIG. 3, on the sheet with FIG. 3C, is a view showing the orientation of FIGS. 3A, 3B and 3C;

FIGS. 6A, 6B and 6C, respectively, show different dot matrix patterns of the numeral "0"; FIG. 6A showing the dot pattern in the normal state, FIG. 6B showing the pattern in the state turned at 90 degrees, and FIG. 6C showing the pattern in a two times or twice broadened state;

FIG. 7E shows a state wherein all data on the first line dot row of the first line of characters shown in FIG. 7B are set in the shift registers shown in FIG. 3C;

FIG. 7F is a diagram wherein all dot data on the first character line in FIG. 7B are shown separately according to the line dot row;

DESCRIPTION OF THE PREFERRED EMBODIMENT

Figure 1:
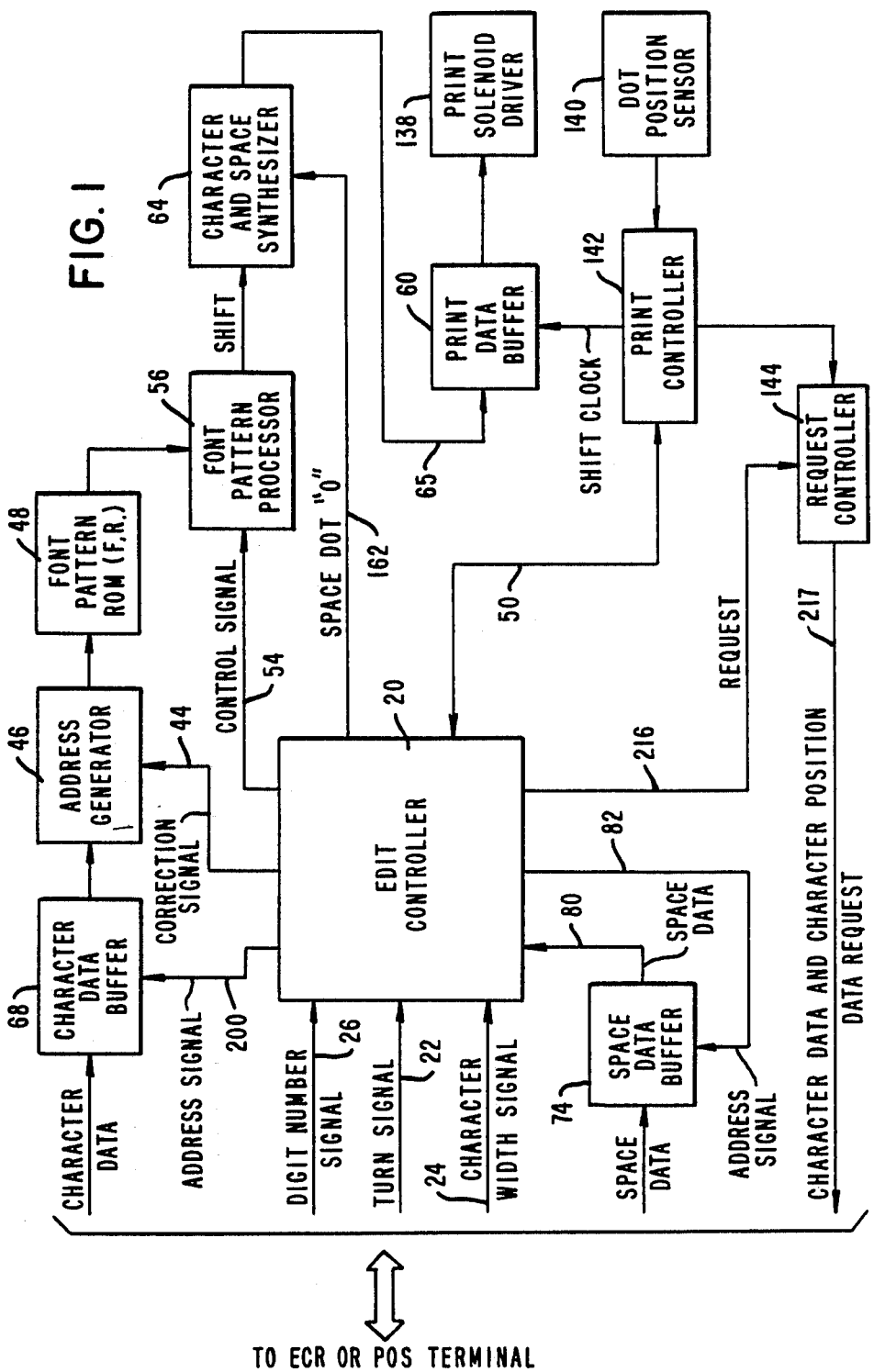
FIG. 1 is a block diagram showing the schematic structure of an embodiment of the present invention.

Prior to describing the structure of the present invention, it should be noted that the invention is applicable with either a multi-dot printer or a line dot printer. A multi-dot printer is provided with a plurality of print heads corresponding to the number of dot rows so that a print data buffer requires an arrangement in parallel for one column of dots of a character equal to the number of print heads. The number of character dot spaces specified by the space data must be input into the print buffers also in an arrangement corresponding to the number of print heads.

In the multi-dot printer, the print timing can be optionally selected in the manner wherein printing may be performed or accomplished each time a dot row is input into the print data buffer, printing may be performed for each character, or printing may be performed after one character line is input into the print data buffer, the selection being dependent upon the size of the print data buffer and the processing speed of associated apparatus or devices.

In the line dot printer, the dot print heads are provided and positioned at regular intervals in the lateral direction along the line of printing and are driven simultaneously so that for dots to be printed, it is necessary that each of the dot print heads be provided with dot data. However, in the case of printing with turned characters, as is accomplished with the present invention, the number of dot columns varies with the turning of the character. Accordingly, the dot data that is provided to each print head differs in content for the printing of turned characters from the content for the printing of unturned characters. In the normal 5×7 dot matrix character, the five dots are arranged in five columns and seven dots are arranged in seven rows, whereas in a character turned at 90 degrees, the dots are rearranged in a seven column and five row format. In the turned format, the dot columns are elongated in the lateral direction and the positions of the dot data are shifted in the lateral direction an amount corresponding to the elongated dot columns. It is thus seen that by reason of different print dot data being supplied to the print heads for the different printing operation, the print data buffer is capable of storing all the dot data for one line dot row, and all data for such one line dot row is prepared and stored in the print data buffer prior to the printing operation. The preparation of all dot data on one line dot row prior to printing is referred to as "one line editing". All the dot data that is provided to the individual print heads in the "one line edit" arrangement makes possible the turned printing operation with the use of the line dot printer.

Since the one line edit arrangement is for one line dot row, a font pattern processor selects the dot data required for the dot rows and rearranges the dot data in preparation for reading out the dot patterns and making ready for the printing operation. The dot data for one line dot row which is processed in the font pattern processor is synthesized or combined with space dot data in a character and space synthesizer and the combined data are sequentially input into the print data buffer. The inputting of the dot data into the print data buffer is repeated until all data stored in the character data buffer and in the space data buffer (or any other special codes) are read out from the buffers to enable completion of the editing of one line dot row. Printing of one line dot row is accomplished in accordance with clock signal instructions from the print controller and the next one line dot row is prepared and edited. The editing and the printing of each line dot row are alternately repeated and at the completion of printing of all the line dot rows in one character line, a request signal is sent from a request controller to the POS terminal for additional data.

The following table is a listing of the headings utilized in describing the invention.
A. General Structure
B. Initialization
C. Editing of Space Before First Character
D. Dot Row Editing of the First Character
E. Editing of One Line Dot Row
F. One Character Line Printing
G. Description of the Selection Signal Generator and the Clock Generator
H. Embodiment using Microcomputer
  (i) Structure
  (ii) Non-turned Character
  (iii) 180° Turned Character
  (iv) 90° Turned Character
  (v) 270° Turned Character A. General Structure Referring now to the drawing, FIG. 1 is a block diagram of the structure of the present invention and utilizing a line dot printer, as mentioned above, for accomplishing the turned character printing in a preferred embodiment of the invention.

Figure 2A:
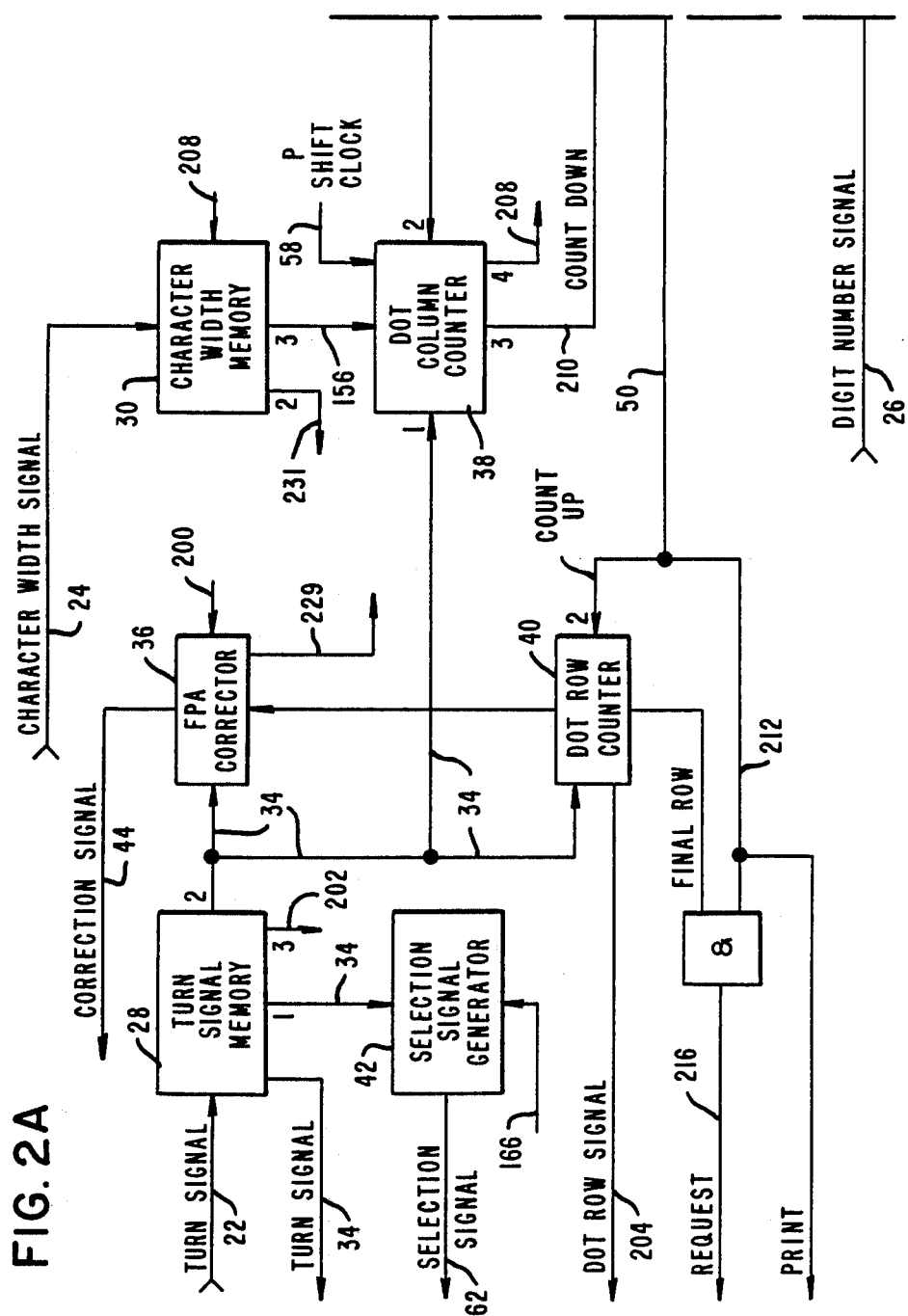
FIGS. 2A and 2B, taken together, constitute a block diagram of an embodiment of the edit controller incorporated into the line dot printer.
Figure 2B:
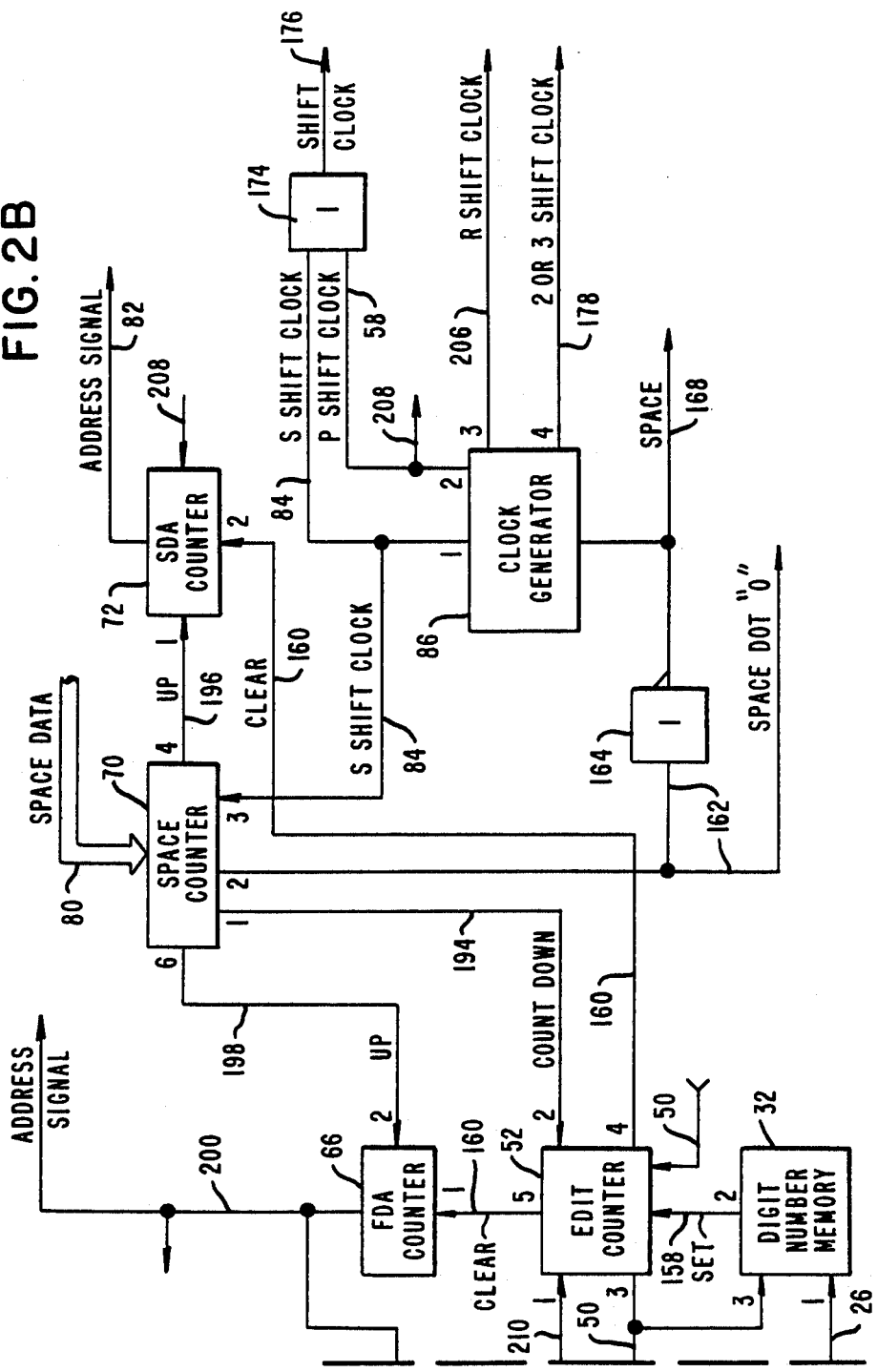

An edit controller 20 is an important part of the present invention as being associated with a line dot printer and such controller is coupled to receive a turn signal 22, a character width signal 24 and a digit number signal 26 sent from the ECR or POS terminal (not shown). These signals 22, 24 and 26 are stored, respectively, in a turn signal memory 28 (FIG. 2A), a character width memory 30, and a digit number memory 32 (FIG. 2B). FIGS. 2A and 2B illustrate the various devices and arrangement of the edit controller 20 with detailed portions thereof. The turn signal 22 which is stored in the turn signal memory 28 is sent as an output turn signal 34 to a font pattern address corrector (FPA corrector) 36, a dot column counter 38, a dot row counter 40, and a selection signal generator 42. The output turn signal 34 is also sent from the turn signal memory 28 of the edit controller 20 to a row selector, later described. The FPA corrector 36 sends a 3-bit address correction signal 44 to an address generator 46 (FIG. 1) in accordance with signals sent from the turn signal memory 28 and the dot row counter 40 to correct a read address for a font pattern ROM 48. The dot row counter 40 counts up from 1 to a predetermined count, as determined by the turn signal 34, in accordance with an output signal 50 from an edit counter 52 (FIG. 2B). The output signal 50 is sent to the dot row counter 40 and also to the digit number memory 32 and to a print controller 142 (FIG. 1) as control signals to perform other functions to be described. As shown in FIG. 2A, the output signal 50 from the edit counter 52 provides a count up instruction to only the dot row counter 40. Accordingly, and as will be apparent from the following description, the dot row counter 40 indicates which dot row is now being printed and a control signal 54 from the dot row counter 40 of the edit controller 20 (FIG. 1) is sent to the font pattern processor (pattern processor) 56 (FIG. 1) as a dot row signal to be used for the preparation of a dot row font pattern for turned printing or printing of turned characters. The number of dot columns for an ordinary character or for a turned character, whichever character is determined by signals from the character width memory 30 and the turn signal memory 28 for the printing operation, is set in the dot column counter 38 and is counted down by a pattern shift clock (P shift CLK) signal 58 (FIG. 2A) each time a font pattern dot is shifted in a print data buffer 60 (FIG. 1).

The selection signal generator 42 generates a selection signal 62 (FIG. 2A) which is one of the control signals used in the font pattern processor 56 and in the character and space synthesizer (FS synthesizer) 64

(FIG. 1) and sends the selection signal to the font pattern processor 56 and to the FS synthesizer 64. A signal line 65 couples the FS synthesizer 64 and the buffer 60. A character data buffer address counter (FDA counter) 66 (FIG. 2B) is a counter adapted to address a character data buffer 68 (FIG. 1), and is counted up every time a space counter 70 (FIG. 2B) is counted down to "0". A space data memory address counter (SDA counter) 72 is a counter adapted to address a space data buffer 74 (FIG. 1) and is counted up each time the space counter 70 is counted down to "0". Space data 80 (FIGS. 1 and 2B) which is read out of the space data buffer 74 by an address signal 82 sent from the SDA counter 72 is stored in the space counter 70, and is counted down therein by a space shift clock (S shift CLK) signal 84 (FIG. 2B). Bit data "0" which is indicative of a space dot is sent from the space counter 70 of the edit controller 20 (FIG. 1) as a space dot "0" signal to the FS synthesizer 64 during the generation of the S shift CLK signal 84.

A digit number which is stored in the digit number memory 32 (FIG. 2B) also is stored in the edit counter 52. This digit number is indicative of the number of dots in the one line dot row and is counted down simultaneously with the counting down of both the dot column counter 38 and of the space counter 70 (FIGS. 2A and 2B). As described above, since the digit number stored in the edit counter 52 is indicative of the number of all dots in the one line dot row, counting the edit counter 52 down to "0" means that all data on the one line dot row are stored in the print data buffer 60 (FIG. 1). Accordingly, as the edit counter 52 is counted down to "0", the dot row counter 40 is counted up by one and the digit number is again sent from the digit number memory 32 to the edit counter 52 to be set therein for the editing of the line dot row.

A clock generator 86 (FIG. 2B) is adapted to generate various shift clocks. Details of the clock generator 86 and of the selection signal generator 42 are described later.

The operation of the edit controller 20, as illustrated in FIGS. 2A and 2B, and the structure and operation of the line dot printer according to an embodiment of the present invention, will be described with reference to FIGS. 3–7, inclusive.

Figure 3A:
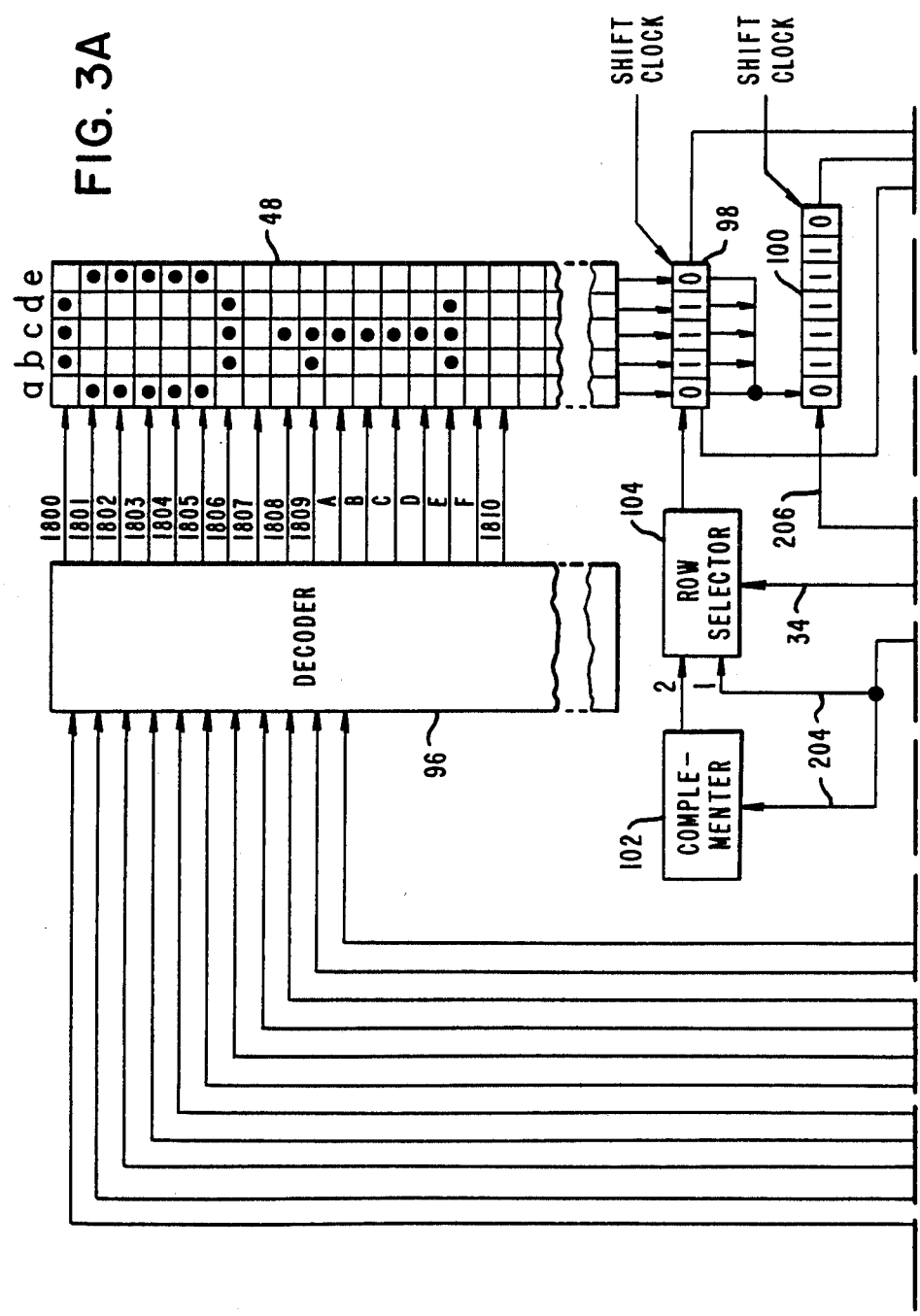
Figure 3B:
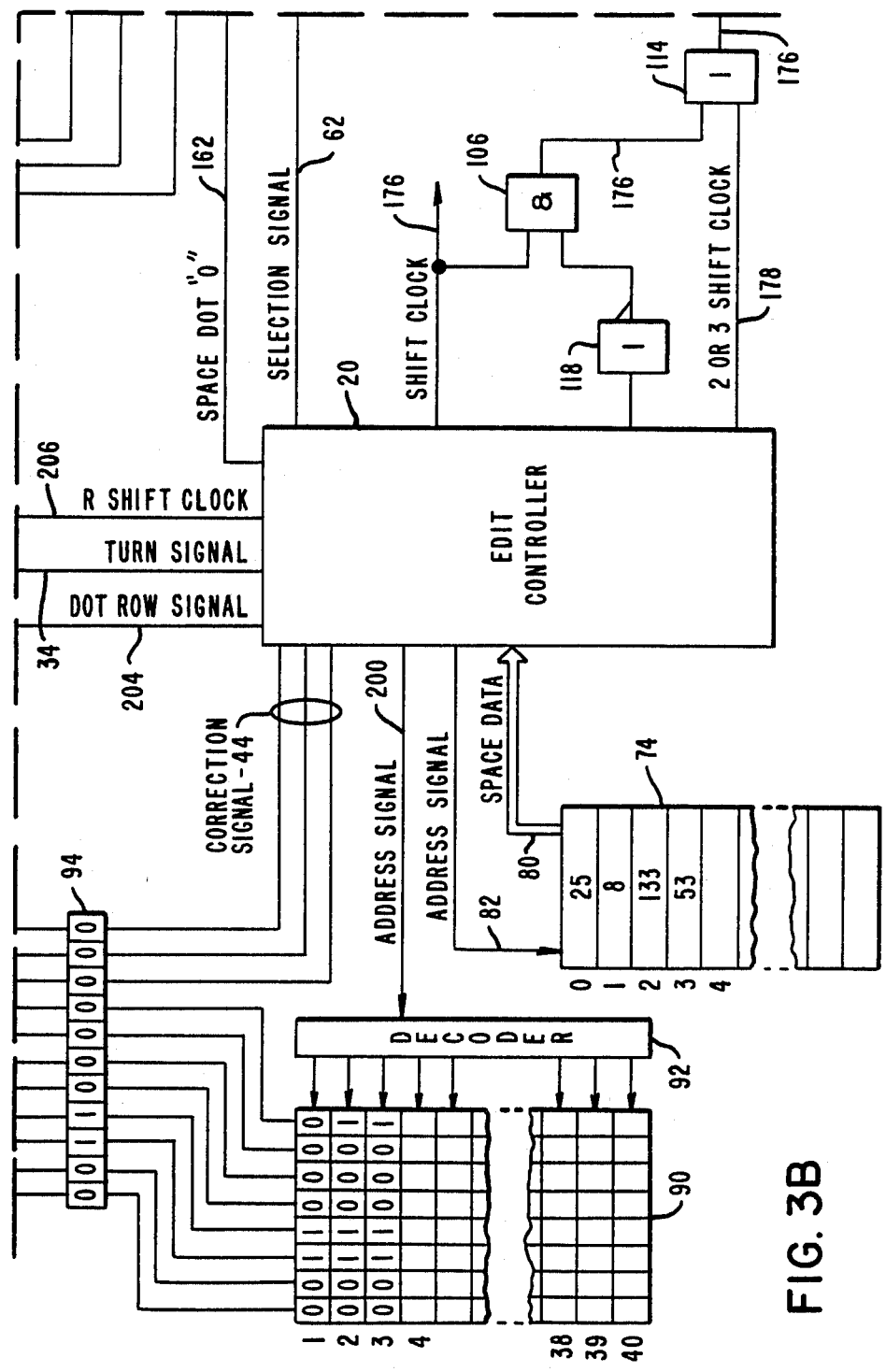

FIGS. 3A, 3B and 3C show an outline structure for the explanation of an embodiment in which the concept of the present invention is applied to a line dot printer utilizing four print heads. The edit controller 20, illustrated in FIG. 3B, is of the same structure as that in FIGS. 2A and 2B. The illustrated structure in FIGS. 3A, 3B and 3C generally corresponds with that of FIG. 1, wherein a character data memory or character data register 90 (hereinafter referred to as FD memory) and a decoder 92 (FIG. 3B) correspond to the character data buffer 68 in FIG. 1, and an address register 94 (FIG. 3B) and a decoder 96 (FIG. 3A) correspond to the address generator 46 in FIG. 1. The font pattern ROM 48, shown in FIGS. 1 and 3A, is coupled to the decoder 96. A register 98, a register 100, a complementer 102 and a row selector 104 in FIG. 3A correspond to the font pattern processor 56 in FIG. 1. Register 98 is referred to as the A register and register 100 is referred to as the B register.

An AND gate 106, a data selector 108, a divide by 60 counter 110, a 2-bit counter 112, an OR gate 114, a demultiplexer 116, an inverter 118, and a demultiplexer 120 (FIGS. 3B and 3C) provide structure corresponding to the character and space synthesizer 64 (FIG. 1). Data selectors 122, 124, 126 and 128 and shift registers 130, 132, 134 and 136 provide structure corresponding to the print data buffer 60 (FIG. 1). The space data buffer 74, a print solenoid driver 138 and a dot position (DP) sensor 140 are illustrated in FIG. 1 with connections of the solenoid driver and the sensor being shown in FIG. 3C.

A print controller 142 and a request controller 144 are shown in FIG. 1, and a print shift clock signal 146 (print CLK) from the DP sensor 140 (FIG. 3C) is shown to be directly input into the data selectors 122, 124, 126 and 128.

The line dot printer, as exemplified by the four print heads shown in FIG. 3C, includes a print station capable of printing up to 40 characters maximum on each line, and each character is constituted by 5 horizontal dots and 7 vertical dots, as shown in FIG. 6A, and arranged as the 5×7 dot matrix character "0". Accordingly, the character "0", when turned or rotated by 90 degrees or by 270 degrees, is constituted by a 7×5 dot matrix, as shown in FIG. 6B, and when the width of the character is broadened or doubled in the lateral direction, it is constituted by a 10×7 dot matrix, as shown in FIG. 6C. The number of dots on the one line dot row totals to 240 ((5 font dots+1 space dot)×40=240), assuming a space of one dot is provided after each character.

Figure 7A:
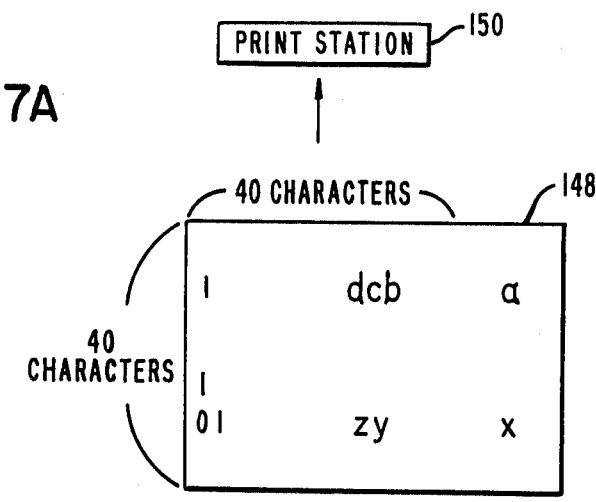
FIGS. 7A and 7B, respctively, show the relationship and orientation of the print station and the slip for the normal and for the turned printing operations.
Figure 7B:
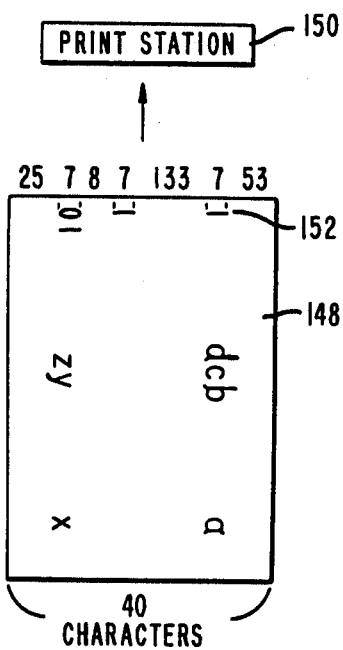

If a laterally elongated slip 148 which requires more than 40 characters for each line, as shown in FIG. 7A, is inserted into a printer which is capable of printing only 40 characters maximum for each line when the slip is oriented in the laterally elongated state, it is seen that the characters "a" and "x" cannot be printed on the right-side portion of the slip 148. Thus, in the present invention, the slip 148 is inserted into the printer in the vertically oriented state, as shown in FIG. 7B, and a character is turned or rotated in accordance therewith, thereby permitting the printing of characters on the laterally elongated slip 148. Although the characters and the numerals such as "a, b, c, d, 0 and 1", as shown on the slip 148 in FIGS. 7A and 7B, are to be printed on the slip during its passage through the print station 150, such characters and figures are shown as being already printed on the slip for an easier explanation of the printing operation.

B. Initialization

The start of a printing operation directed to the printing of the numerals "0, 1 and 1" on the first column or line 152 of the slip 148 is shown in FIGS. 7A and 7B wherein the slip is turned clockwise or to the right by 90 degrees in FIG. 7B, from the orientation of such slip in FIG. 7A, for insertion into the printer.

Figure 7C:
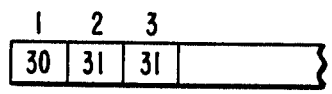
FIGS. 7C and 7D, respectively, show the character data and the space data on the first line of printing wherein characters are printed in accordance with the state or orientation shown in FIG. 7B.

The character data for the numerals "0", "1" and "1" to be printed on the first line 152 of the slip 148 is sent from the POS terminal to the printer structure, in the arrangement as shown in FIGS. 3A, 3B and 3C. The character data thus received at the printer is sequentially stored in the character data buffer 68 (FIG. 1) in the form of ASCII code, as shown in FIG. 7C. However, such character data can be stored in any other coded form in place of the ASCII code so as to facilitate the address selection of the font pattern ROM 48.

Figure 7D:
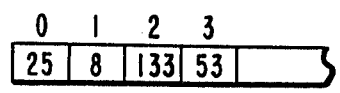

Space data is defined as, or indicative of, an inter-character or non-character space by the dot number or the number of space dots. As is apparent from the figures written above the slip 148 in FIG. 7B, the first line 152 on the slip is constituted by 240 dots, thereby comprising 25 space dots, 7 font dots, 8 space dots, 7 font dots, 133 space dots, 7 font dots and 53 space dots. Accordingly, the space data sent from the POS terminal and stored in the space data buffer 74 for the top line 152 is "25", "8", "133" and "53", as shown in FIG. 7D, and where the font dot data are "7", "7" and "7". It is to be noted that the last space data "53" may be in any other specifically coded form consistent with and indicative of the dot space.

The control signals comprising the turn signal 22 which is indicative of and used for turning or rotating by 90 degrees of a character to be printed, the character width signal 24 indicative of the normal character width, and the digit number signal 26 indicating that one line dot row is constituted by 240 dots, are sent from the POS terminal, and are stored in the turn signal memory 28, the character width memory 30, and the digit number memory 32, respectively, in the edit controller 20, as illustrated in FIGS. 2A and 2B.

The turn signal 22 stored in the turn signal memory 28 is input as signal 34 into the FPA corrector 36, the dot column counter 38 and the dot row counter 40 (FIG. 2A). The dot row counter 40 confirms that the character is turned by 90° and is constituted by 5 dot rows (FIG. 6B) in accordance with the turn signal 34 from the turn signal memory 28, and the dot row counter stores the numeral as the upper limit of the counting up process and sets the dot row counter 40 to "1".

The number of 7 dot columns of the turned character (FIG. 6B) is set in the dot column counter 38 (FIG. 2A) in accordance with the turn signal 34 by an amount of 90° from that in the turn signal memory 28 and the normal character width signal 24 from that in the character width memory 30.

When "240", as indicative of the number of dots on one line dot row, is set in the digit number memory 32 in accordance with the digit number signal 26, the memory 32 initializes the edit counter 52 to "240" by a signal 158 (FIG. 2B). The edit counter 52 thus set or initialized sends an initialization signal 160 to the FDA counter 66 and to the SDA counter 72 which are then cleared to "0".

C. Editing of Space Before First Character

When the SDA counter 72 is cleared to "0" by the initialization signal 160 from the edit counter 52 (FIG. 2B), the SDA counter outputs the address signal 82 to specify the address 0 to read the space data 80 out of the address 0 in the space data buffer 74 (FIGS. 1 and 3B).

As seen in FIG. 3B, the figure "25" is stored in the address 0 in the space data buffer 74, so that "25" is read out as the space data 80 and is stored in the space counter 70 (FIG. 2B). When the space data 80 is stored in the space counter 70, a signal "0" indicative of the space dot and designated as signal 162 is output from the space counter 70 to an input 5 of the data selector 108 in FIG. 3C. The space dot "0" signal 162 from the space counter 70 also is inverted by an inverter 164 (FIG. 2B) and then is input as a space signal 166 into the selection signal generator 42 (FIG. 2A) and into the clock generator 86 (FIG. 2B).

The selection signal generator 42, upon receipt of the space signal 166, sends the selection signal 62 to the data selector 108, as seen in FIG. 3C, and which signal selects the input 3 of the data selector. Accordingly, the space dot "0" signal 162 which is loaded on the input 5 is output as a signal 170 to an input 3 of the demultiplexer 116.

The clock generator 86 (FIG. 2B), upon receipt of the space signal 166, generates the space shift clock (S shift CLK) signal 84 and sends it to the space counter 70 to count down the space counter and also simultaneously sends the S shift CLK signal 84 to the divide by 60 (1 to 60) counter 110 and to the demultiplexer 120 (FIG. 3C) through an OR gate 174 (FIG. 2B), through the AND gate 106 and the OR gate 114 (FIG. 3B) as a shift clock (shift CLK) signal 176.

The divide by 60 counter 110 (FIG. 3C) is a counter adapted to count the number of printable dots that are processed by one dot print head, such number being 60 dots that are processed by one print head and in the case of a line dot row consisting of 240 dots that are being printed by the four single dot print heads. The count number can be appropriately changed in conformity with the number of dots and the print head number for one line dot row. The 2 or 3 shift clock (2 or 3 shift CLK) signal 178 (FIG. 2B) is output from the clock generator 86, so that the divide by 60 counter 110 (FIG. 3C) is counted up by the shift CLK signal 176. The divide by 60 counter 110, after counting up to "60", is again counted up by a next clock starting from "1" and sends a count-up signal 180 to the 2-bit counter 112 to count up such counter (FIG. 3C). Accordingly, until the divide by 60 counter 110 is counted up to "60", the 2-bit counter 112 outputs a buffer selection signal "0", as designated by signals 182 and 184, to the signal selection input terminals 1 and 2 of demultiplexers 116 and 120. Thus, the demultiplexer 120 selects an output terminal 0 and outputs therefrom a shift CLK signal 186 which is input into an input terminal of the data selector (DS) 122. Since the data selector 122 has already selected an input from the demultiplexer 120 in accordance with the signal from the print controller 142, the shift CLK signal 186 thus input into selector 122 is sent as a signal 188 to the shift register 130. The buffer selection signals 182 and 184 from the 2-bit counter 112 are also sent to the demultiplexer 116 and select an output terminal 0 of the demultiplexer, so that the space dot "0" signal 162, as input into data selector 108, is sent therefrom as the signal 170 from the data selector 108 and is output from the output terminal 0 of the demultiplexer 116 as a signal 192 to the shift register 130. Accordingly, the space dot "0" signals are sequentially shifted into the shift register 130 each time the shift CLK signal 186 is generated and are sent through the data selector 122 as the signal 188 to the shift register.

Since the space data "25" is set in the space counter 70 (FIG. 2B) of the edit controller 20 (FIG. 3B), when the space counter 70 is counted down 25 times by the S shift CLK signal 84, the count becomes "0". The edit counter 52 is also counted down in association with the space counter 70 through the count down signal 194. When the space counter 70 is counted down to "0", an output terminal 2 thereof effectively stops the output of the space dot "0" signal 162 and, simultaneously therewith, signals 196 and 198 are sent from output terminals 4 and 6, respectively, of the space counter to count up the SDA counter 72 and also the FDA counter 66 by one. When no "0" signal 162 is output from the space counter 70 through the output terminal 2 thereof, the clock generator 86 effectively stops the output of the S shift CLK signal 84, so that the shift register 130 (FIG. 3C) stops the operation in a state wherein 25 space dot "0"s are shifted into the register from the left end thereof.

D. Dot Row Editing of the First Character

When the FDA counter 66 (FIG. 2B) is counted up to "1" by the signal 198 from the space counter 70, an address signal 200 for specifying the address 1 in the character data buffer 68 (FIG. 1) is sent to the decoder 92 (FIG. 3B) wherein the character data "30" is read out of the first address in the FD memory 90 and is input into the fourth to eleventh bits of the address register 94. The address signal 200 is also sent to the FPA corrector 36 to activate the generation of the address correction signal 44. The FPA corrector 36 applies the address correction signal 44 to the first three bits in the address register 94 (FIG. 3B), which signal is adapted to correct the read out address of the font pattern ROM 48 (FIG. 1) in order to print the 90° turned character in accordance with a signal 202 from the turn signal memory 28 (FIG. 2A). The signal 202 is directed to the clock generator 86. It is to be noted that three lower order bits are employed for the printing of the 5×7 dot matrix character; however, 4 or more bits are sometimes required in case the number of row or column dots for each character exceeds 8 dots.

It is necessary in the operation of the apparatus to read the first row of the 90° turned character "0", as shown in the first row dot pattern of FIG. 6B. The first row dot pattern is stored in the addresses 1800 to 1806 of the font pattern ROM 48 (FIG. 3A), so that it is necessary to sequentially read the seven individual addresses. It should be noted that in the case of the 90° and 180° turned characters, it is necessary to read the higher order addresses first. For this purpose, the FPA corrector 36 (FIG. 2A) counts down the content of the address register 94 (FIG. 3B) one by one starting from the address 1806 by sequentially counting down the address correction signal 44 from 6 to 0. In the case of the 270° turned character, the address correction signal 44 is counted up to 6 starting from 0.

Data read out of the font pattern ROM 48 (FIG. 1) is input into the A register 98 (FIG. 3A), which structure consists of a shift register that is capable of shifting in both directions. In the case of the ordinary (normal) character or of the 180° turned character, the reading out of one address permits the dot pattern of one dot row to be fetched out, so that by changing only the shifting direction in accordance with that of the turned character can the contents of the A register 98 be shifted into the shift register 130 (FIG. 3C). The shift register 130 is associated with and a part of the print data buffer 60 (FIG. 1) by coupling through the data selector 108 and the demultiplexer 116. However, in the case of the 90° or of the 270° turned character, it is necessary to read all of the seven addresses and to select data on a corresponding dot row from the data thus read out. More specifically, in the case of the 90° turned character, the first dot row corresponds to the "a" column of the font pattern ROM 48 (FIG. 3A) and the second and succeeding dot rows correspond to the "b, c, d and e" columns of the ROM. Since it is necessary to fetch the first dot of the first dot row of the first character on the first line, the address 1806 of the font pattern ROM 48 is specified and the dot pattern data is read out in the form shown in the A register 98 in FIG. 3A. In this form, the bit data "1" is indicative of the presence of a dot and the bit data "0" is indicative of the absence thereof. Additionally, in the first dot row, the dot data "0" corresponding to the "a" column is fetched out of the A register 98 by a dot row signal 204 from the edit controller 20 (FIG. 3B) and is sent to the A register 98 through the row selector 104 and is sent to the B register 100 (FIG. 3A). Next, the address correction signal 44 (FIG. 3B) is counted down and the dot pattern data "10001" is read out of the address 1805 (FIG. 3A). When the address correction signal 44 is counted up or down, a rotation shift clock (R shift CLK) signal 206 is sent from the clock generator 86 (FIG. 2B) to the B registr 100 (FIG. 3A) to shift the data in the B register to the right by one. Thereafter, data "1", corresponding to the "a" column in the dot pattern data, is read out to the A register 98 and is input into the left-most end of the B register 100. The above mentioned procedure is repeated until the data is read out of the address 1800 of the font pattern ROM 48 (FIG. 3A), wherein the data "0111110" (FIG. 6B) of the first dot row of the 90° turned character is set up in the B register 100, as illustrated in FIG. 3A.

In the case of the 270° turned character, the first five rows of the character correspond to the "e" to "a" columns of the font pattern ROM 48, so that the dot data in the A register 98 (FIG. 3A) is fetched starting from the one corresponding to the "e" column, that is, in the reverse order of that from the case of the 90° turned character in an arrangement which utilizes the complementer 102.

The selection signal 62 is sent from the selection signal generator 42 (FIG. 2A) of the edit controller 20 (FIG. 3B) to the data selector 108 (FIG. 3C) to select an input terminal 3, and simultaneously therewith, the P shift CLK signal 58 is output from the clock generator 86 (FIG. 2B), wherein the shift CLK signal 176 is sent through the inverter 174 to the B register 100, to the divide by 60 counter 110 and to the demultiplexer 120 (FIGS. 3B and 3C). When the shift CLK signal 176 is sent to the B register 100, the counter 110 and the demultiplexer 120, in the case of the space data, the data in the B register 100 is shifted into the shift register 130 bit by bit. The P shift CLK signal 58 is also supplied to the dot column counter 38 (FIG. 2A) which is counted down each time such P shift CLK signal is generated. When the dot column counter 38 is counted down to "0", a signal 208 is sent through an output terminal 4 of the counter 38 to the clock generator 86 (FIG. 2B) to stop the generation of the P shift CLK signal 58. Accordingly, in the case of the 90° turned character, seven P shift CLK signals 58 and shift CLK signals 176 are output for each dot row. The dot column counter 38 (FIG. 2A) also outputs a signal 210 through an output terminal 3 of the counter each time it is counted down, and such signal 210 counts down the edit counter 52 (FIG. 2B). Since 25 space dots and 7 font dots have already been shifted into the shift register 130 (FIG. 3C), the edit counter 52 is in a state of being counted down to "200" (240−25−7) and the divide by 60 counter 110 is in a state of being counted up to "32" (FIG. 7B).

E. Editing of One Line Dot Row

When the dot column counter 38 (FIG. 2A) is counted down to "0", the signal 208 is sent to the SDA counter 72 through an output terminal 4 of the counter 38, so that a space data "8" is read out of the address 1 in the space data buffer 74 (FIG. 3B) and is stored in the space counter 70 (FIG. 2B). Thereafter, the space dot "0" signal 162 is output through an output terminal 2 of the space counter 70. It is apparent that the second space data "8" can be read out to the space counter 70 in advance of the editing of the first character, and the space dot "0" signal 162 can be output through the output terminal 2 of the counter 70 when the dot column counter 38 is counted down to "0". When the space dot "0" signal 162 is output, 8 bit "0"s are shifted into the shift register 130 (FIG. 3C) as in the case of the first space data.

Thereafter, the space counter 70 is counted down to "0", wherein the FDA counter 66 (FIG. 2B) is counted up by one to read out data "31" in the address 2 in the FD memory 90 (FIG. 3B) and the data "31" thus read out is synthesized with the address correction signal 44 to read data in the font pattern ROM 48 (FIG. 3A). The second character is the numeral "1", so that data in the addresses 180E to 1808 (FIG. 3A) are sequentially read out of the font pattern ROM 48. Thereafter, the font dot data "0000000" is shifted into the shift register 130 (FIG. 3C) in the same manner as that of the first charater. Upon completion of the inputting of the second character into the shift register 130, the edit counter 52 is counted down to "193" (240−25−7−8−7) and the divide by 60 counter 110 is counted up to "47" (FIG. 7B).

Next, the third space data "133" (FIG. 7B) is read out by the space counter 70 (FIG. 2B) and hence 133 space dot "0"s are sequentially shifted into the shift registers 130, 132 and 134 (FIG. 3C) in the same manner as above. The shift registers 130, 132 and 134, into which the space dot "0"s are to be entered, are changed over in the following manner: when 13 "0"s of the 133 "0"s are input into the shift register 130, the divide by 60 counter 110 is counted up to "60", and when the shift CLK signal 176 is input into the divide by 60 counter 110 in order to input the fourteenth "0", the divide by 60 counter is set to "1" and the 2-bit counter 112 is counted up to "1", so that output terminals 1 of both demultiplexers 116 and 120 are selected. As a result, the fourteenth and succeeding "0"s are shifted into the shift register 132.

Figures 7E, 7F:
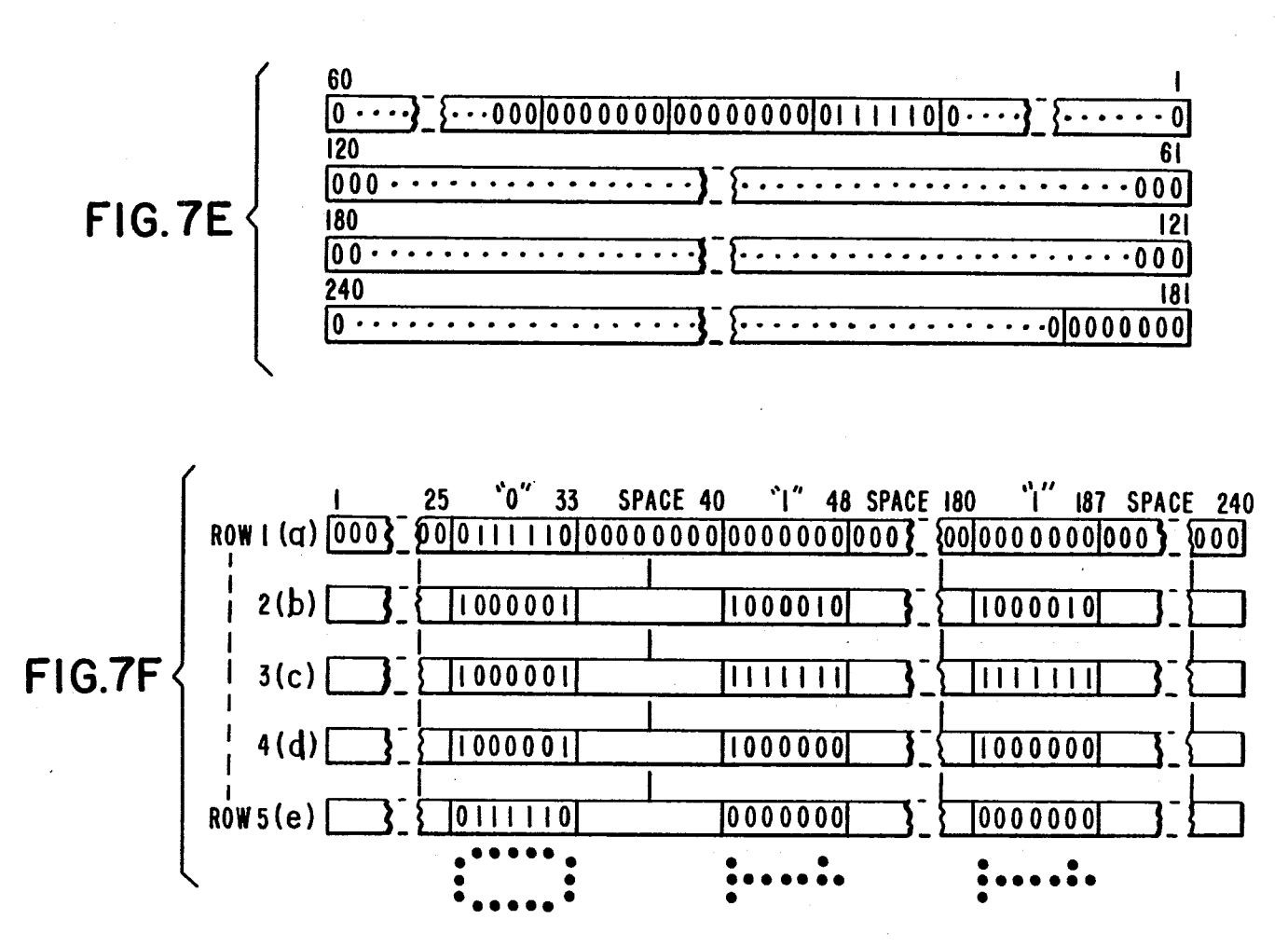

Each time the divide by 60 counter 110 is counted up to "60", the shift register arrangement is changed from register 132 to 134 and from register 134 to 136 in the same manner as described above, and the space dots or font pattern dots are shifted into the respective register until the edit counter 52 (FIG. 2B) is counted down to "0" to complete the editing of one line dot row. FIG. 7E shows the state or condition of the completion of one line dot row.

When the edit counter 52 is counted down to "0", the signal 50 is sent to the dot row counter 40 (FIG. 2A) and to the digit number memory 32 through an output terminal 3 of the edit counter, wherein the dot row counter 40 is counted up by one to "2" and the digit number memory 32 resets the data "240", which is indicative of one dot row, to the edit counter 52 for preparation of the editing of the next line dot row.

Alternatively, the present invention can be constructed such that in case initially a space of the size corresponding to 8 dots is left, then only one character is printed and the remaining data is left as a space. A code such as "00", indicating that the remaining data is left as a space, is stored in an appropriate location (in this case, the address 2) in the space data memory 74 (FIG. 3B) as the space data, wherein after the space data code "00" is sensed, one line of editing is completed upon the counting of the divide by 60 counter 110 up to "60". In the above case, it is necessary in advance to clear all the shift registers 130 to 136 (FIG. 3C) to "0".

F. One Character Line Printing

Upon completion of the editing of one line dot row, a print signal 212 as a portion of the output signal 50 (FIG. 2A) is sent from the edit counter 52 to the print controller 142, dependent upon which input terminals of the DS registers 122 to 128 (FIG. 3C) are selected. A print shift clock signal 146 (print shift CLK) is output from the DP sensor 140, wherein the print shift clocks are supplied to all the shift registers 130 to 136 and four bits (one bit for each register) are simultaneously shifted out to the solenoid DR 138 from the individual shift registers 130 to 136. When the data input into the solenoid DR 138 is "1", the dots are printed, whereas when the data input is "0", no printing is performed. As is apparent from the above description, the shift registers 130 to 136, respectively, constitute print data buffers dedicated to the print heads 1 to 4, so that simultaneous dot printing by the print heads can be accomplished.

When 60 print shift CLK signals 146 (FIG. 3C) are output and the instruction for printing of dot data in the shift registers 130 to 136 is completed, a control signal portion of the output signal 50 (FIG. 2B), indicative of the completion of the one line dot row printing, is sent from the print controller 142 (FIG. 1) to the edit counter 52. The edit counter 52, upon reception of the control signal portion of output signal 50 from the print controller 142, outputs the signal 160 for clearing or activating the SDA counter 72 (FIG. 2B). Then, the space dots and the font pattern dots are shifted into the shift registers 130 to 136 (FIG. 3C) in the same manner as that in the case of the first one line dot row editing, and wherein the second line dot row is edited. A difference from the first one line dot row editing is that in the second line dot row editing the dot row counter 40 (FIG. 2A) is counted up to "2". Accordingly, the "b" column corresponding bits are fetched out of the 5-bit data that is read out of the font pattern ROM 48 (FIG. 3A) and to be used for the editing of one dot row.

Upon completion of the editing of the second line dot row, the printing of the characters is performed in the same manner as that of the first line dot row. Likewise, the editing and printing of the third to fifth line dot rows is repeated to complete the printing of the numerals "0, 1 and 1" on one character line 152 (FIG. 7B). In FIG. 7(F), all dot data on the numerals "0, 1 and 1" on the first character line 152 on the slip 148 in FIG. 7(B) are shown for each line dot row (240 dots), and the dot patterns of the numerals to be printed are shown under the dot data.

Upon completion of the editing or printing of the characters on one character line, a request signal 216, (FIG. 1) wherein character data and space data on the next character line are requested, is sent from the edit controller 20 to the request controller 144 and a data request signal 217 is sent from the request controller to the POS terminal.

G. Description of the Selection Signal Generator and the Clock Generator

Figure 4:
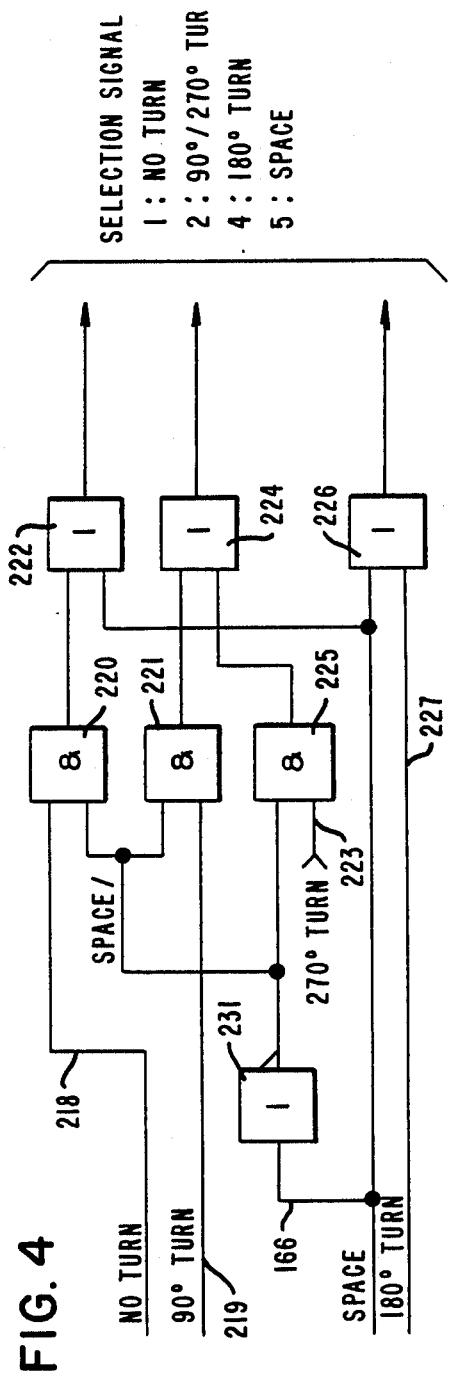
FIG. 4 is a logic diagram of an embodiment of the selection signal generator included in the structure of the line dot printer.

Next, the selection signal generator 42 (FIG. 2A) and the clock generator 86 (FIG. 2B) will be described in more detail in relation to an embodiment thereof. FIG. 4 shows an embodiment of the selection signal generator 42.

For example, in case of the printing of the normal character, a no-turn signal 218 (FIG. 4) is input from the turn signal memory 28 (FIG. 2A) to an AND gate 220 and when a space is not being processed during the input of such no-turn signal, a logic "1" is output through the AND gate 220 and through an OR gate 222, during which time other OR gates 224 and 226 remain at logic "0"level. The selection signal 62 (FIGS. 3B and 3C), and designated as selection signal 1: NO TURN in FIG. 4, is sent to the data selector 108 (FIG. 3C) to connect with an input terminal 3 thereof. In the case of printing a 90° turned character, a signal 219 (FIG. 4) from the turn signal memory 28 is input to an AND gate 221 and a logic "1" is output from the OR gate 224. A signal 223 is input from the turn signal memory 28 to an AND gate 225 and a logic "1" is output from the OR gate 224 for printing a 270° turned character. In the case of the 90° or 270° turn, the logic "1" is output only from the OR gate 224, so that the selection 2: 90°/270° TURN signal is output to couple with the input terminal 3 of the data selector 108. Further, in case of the 180° turn, a signal 227 is input from the turn signal memory 28 to the OR gate 226 and the logic "1" is output only from the OR gate 226, so that the selection signal 4: 180° TURN is output to terminal 3 of the data selector 108. On the other hand, in the case of a space, the signal 166 from the inverter 164 (FIG. 2B) 42 is input through an inverter 231 and the OR gates 222 and 226 are simultaneously selected, so that the selection signal 5: SPACE is output to the data selector 108. Thus, the data selector 108 which receives the outputs from the turn signal memory 28 and from the selection signal generator 42 can select an appropriate input by a selection signal for the no-turn, the 90° turn, the 180° turn, the 270° turn or a space.

Figure 5:
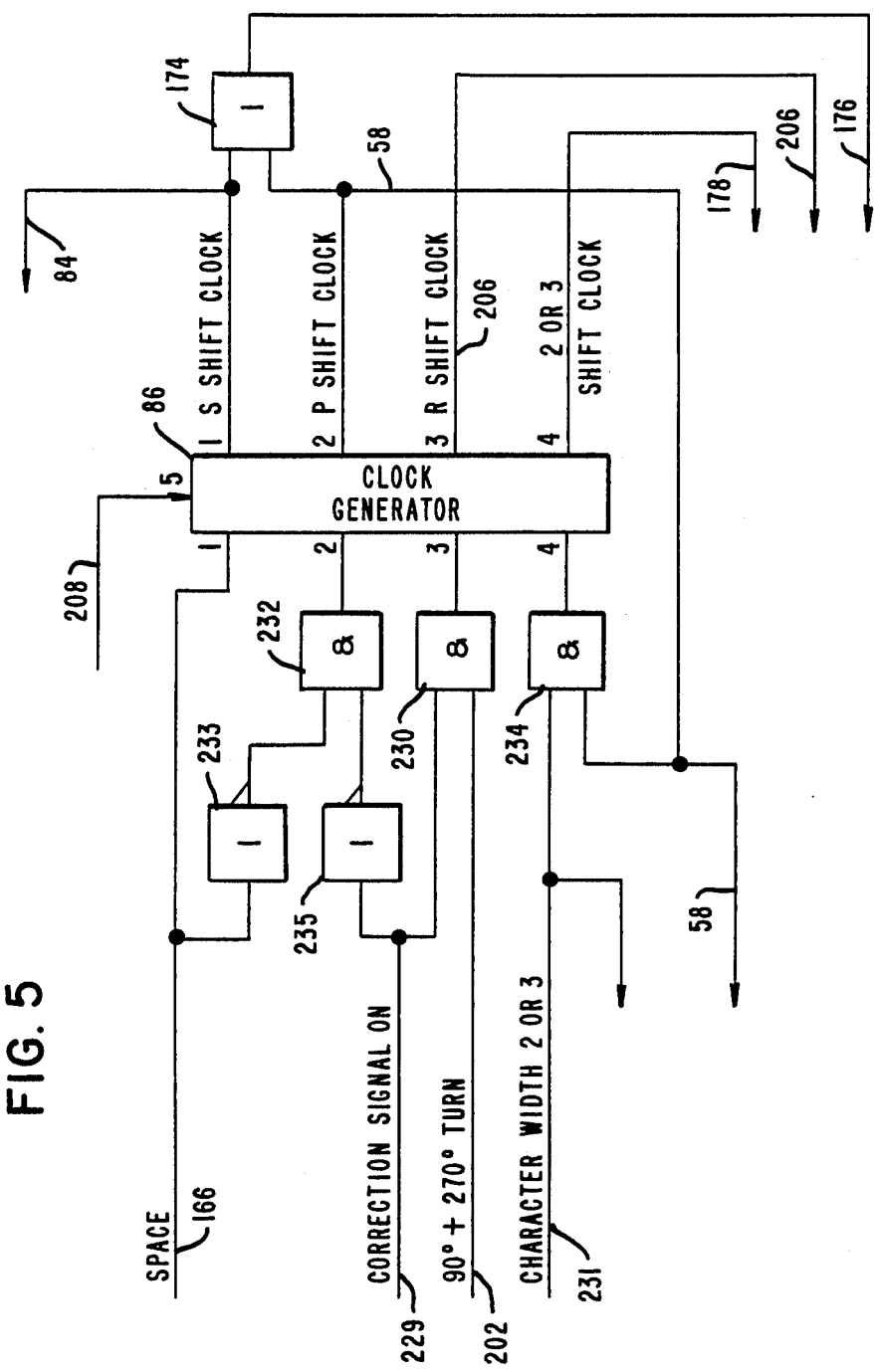
FIG. 5 is a logic diagram of an embodiment of the clock generator incorporated into the printer.

FIG. 5 shows an embodiment of the clock generator 86. When an output 162 from the output terminal 2 of the space counter 70 and through the inverter 164 (FIG. 2B) is input as the signal 166 into the input terminal 1 of the clock generator 86 during the editing of the space dots, the S shift CLK signal 84 is output from the clock generator through the output terminal 1 to the space counter 70 and is simultaneously supplied to other individual apparatus or devices such as registers 98 and 100 and AND gate 106, as the shift CLK signal 176 through the OR gate 174.

When the correction signal ON, designated as lead 229 (FIG. 5), is output from the FPA corrector 36 (FIG. 2A) in the case of the 90° or 270° turned character, an AND gate 230 is activated to output the R shift CLK signal 206 through the clock generator 86 and which CLK signal is adapted to shift the B register 100 (FIG. 3A). The correction signal ON is output during the time of actuation of the address correction signal 44 which is output from the FPA corrector 36 (FIG. 2A) to the address register 94 (FIG. 3B) which register exhibits any change in the data such as counting-up or counting-down.

In the case wherein neither a space is printed nor the correction signal ON is output, the P shift CLK signal 58 is output through an AND gate 232 and through the clock generator 86. The P shift CLK signal 58 counts down the dot column counter 38 (FIG. 2A) and is applied to the individual devices as a shift CLK signal 176 through the OR gate 174 (FIG. 2B). When the dot column counter 38 is counted down to "0", the signal 208 is sent from the output terminal 4 of the dot column counter 38 to an input terminal 5 of the clock generator 86 to stop the generation of the P shift CLK signal 58. An inverter 233 is provided in one input of the AND gate 232 and an inverter 235 is provided in the other input of AND gate 232. The function of the inverters 233 and 235 in the inputs to AND gate 232 is in response to receiving respective false states of the two signals, namely the space signal 166 from the inverter 164 (FIG. 2B) and the correction on signal 229 from the FPA corrector 36, at the respective inputs of the inverters to provide true output signals of the inverters to the AND gate 232. In response to receiving the two true input signals, the AND gate 232 outputs the true signal to the clock generator 86 which outputs the P shift clock signal 58 as an input to OR gate 174. The shift CLK signal 176 from OR gate 174 is directed to registers 98 and 100 (FIG. 3A) and to AND gate 106 and OR gate 114. An alternative arrangement to the inverters 233 and 235 and to the AND gate 232 is the use of a NOR gate.

In the case wherein the character width is doubled or tripled, when a character width signal 228 is input from the character width memory 30 (FIG. 2A) to an input of the AND gate 234 (FIG. 5) and then the other input of the AND gate 234, which is the P shift CLK signal 58, is input into the clock generator 86, a 2 or 3 shift clock signal 178 is output through an output terminal 4 of the clock generator 86. The 2 or 3 shift CLK signal 178 is a clock of a frequency which is two or three times higher than that of the P shift CLK signal 58 and is supplied to the divide by 60 counter 110 and to the demultiplexer 120 (FIG. 3C) through the OR gate 114 shown in FIG. 3B, during which time the AND gate 106 inhibits the shift CLK signal 176 from being input into the divide by 60 counter 110 and the demultiplexer 120. The 2 or 3 shift CLK signal 178 which is input into the demultiplexer 120 is sent to the shift registers 130 to 136 through the DS registers 122 to 128 (FIG. 3C). Accordingly, two or three identical dot data are shifted into the shift registers 130 to 136 during the time when one data in the A register 98, or in the B register 100, is shifted by the shift CLK signal 178, wherein the editing of a character which is doubled or tripled in width is accomplished.

H. Embodiment Using Microcomputer

As mentioned above, the present invention can be embodied with the use of a microcomputer. A second embodiment which is somewhat different from the first embodiment shown in FIGS. 2A, 2B, 3A, 3B and 3C and in which a microcomputer is utilized in the practice of the invention will now be described. The second embodiment is different from the first embodiment in an overall arrangement as follows:

In the second embodiment, elements corresponding to the dot column counter 38 (FIG. 2A) and the B register 100 (FIG. 3A) are not required. Instead, in the case of the 90° or 270° turned character, data is directly input into the print data buffer 60 (FIG. 1) each time the data is selected bit by bit from the A register 98. Accordingly, no R shift CLK signal (as signal 206 in FIGS. 2B, 3A, 3B and 5) is needed.

Although it is possible to embody what is exactly the same as the embodiment shown in FIGS. 3A, 3B and 3C by the use of the microcomputer, the second embodiment is a modification from that as described above in order to exemplify various aspects of the present invention.

Other conditions of the second embodiment are the same as those of the embodiment shown in FIGS. 3A, 3B and 3C. Accordingly, the second embodiment is comprised of a line dot printer which is adapted to print a 5×7 dot character and in which one line dot row is constituted by 240 dots.

(i) Structure

Figure 8:
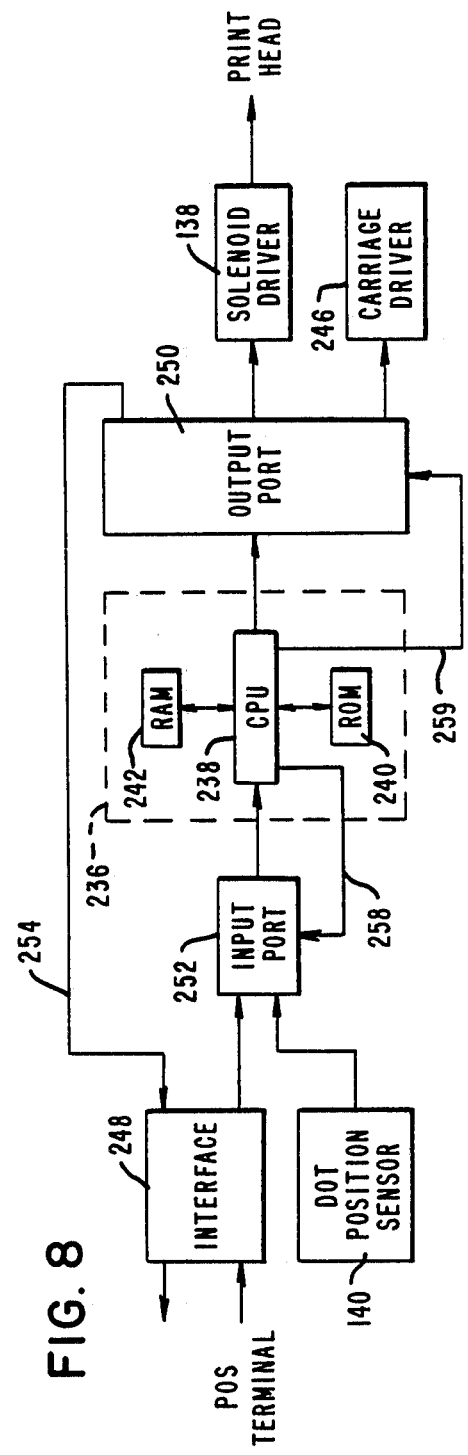
FIG. 8, on the sheet with FIG. 4, is a block diagram showing the structure of the present invention which is embodied with a microcomputer.

FIG. 8 shows the second embodiment of the present invention in which a microcomputer is employed. In FIG. 8 is shown a schematic arrangement of a microcomputer 236 which basically comprises a CPU 238, a ROM 240 and a RAM 242. A program for controlling the CPU 238 is written into the ROM 240 and the CPU fetches the required external data through an input port 252 or interchanges data with the RAM 242 according to the program, then arithmetically processes the data thus fetched or received and outputs the processed data to the solenoid driver 138, to a carriage driver 246 or to an interface 248 through an output port 250. A signal line 254 carries a request signal to the interface 248 and is adapted to request the POS terminal for the data transmission. A signal line 258 is coupled from the CPU 238 to the input port 252 to send instructions to the input port relative to incoming information. A signal line 259 is coupled from the CPU to the output port 250. The signal line 259 is the control for the output port 250 to output respective signals therefrom to the solenoid driver 138, to the carriage driver 246 and to the interface 248. A print solenoid (not shown) is energized or deenergized in accordance with the data sent to the solenoid driver 138 for the printing operation.

Figure 9:
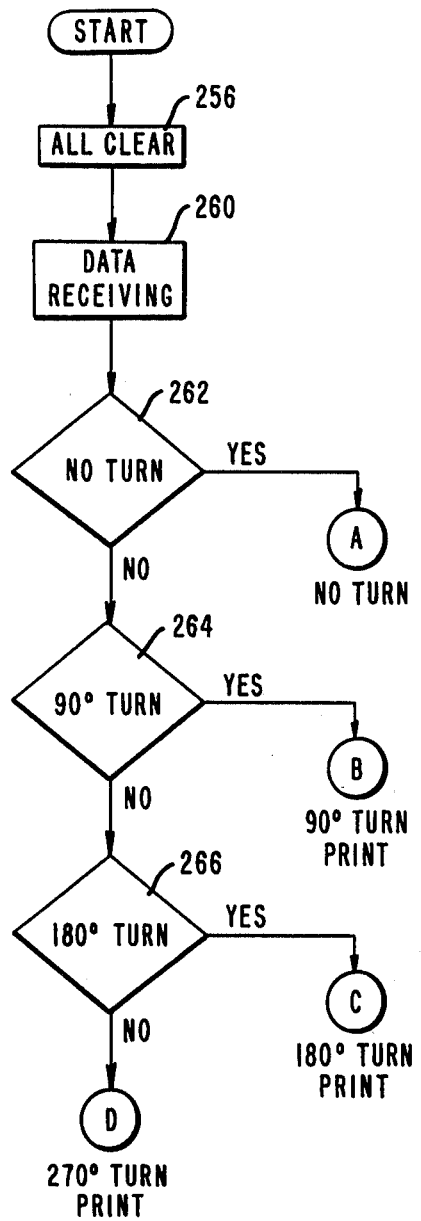
FIG. 9 is a flow chart showing a control program for the several or different possible turns of the dot matrix pattern of a character.

The programs written into the ROM 240 to control the CPU 238 are illustrated in the flow charts for the 180° turned character, the 90° turned character and the 270° turned character. In FIG. 9, when the program is started, the CPU 238 initializes and clears at block 256 the various registers, buffers and counters which are respectively allocated to individual sections of the RAM 242. The CPU 238 supplies a port designation signal to the input port 252 on the signal line 258 to await data from the POS terminal and when data from the POS terminal is sent to the input port 252 through the interface 248, the CPU receives such data at block 260. In accordance with the data sent from the POS terminal, the flow is diverged, respectively, into A in FIG. 10A in the case of the non-turned character (block 262), B in FIG. 11A in the case of the 90° turned character (block 264), C in FIG. 10A in the case of the 180° turned character (block 266) and D in FIG. 11A in the case of the 270° turned character.

(ii) Non-Turned Character

Figure 10A:
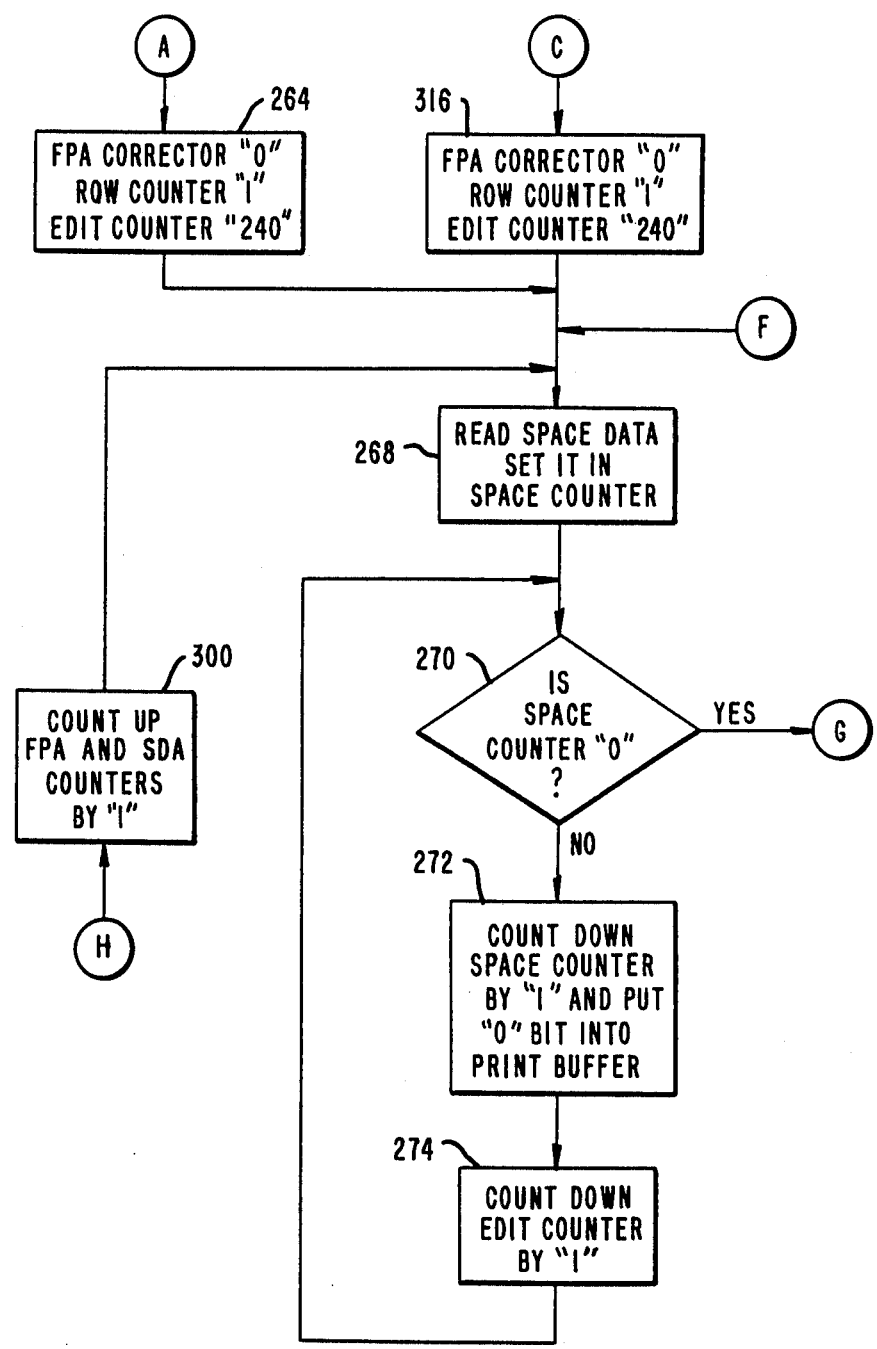
FIGS. 10A and 10B constitute a flow chart showing a control program for the character turned at or through 180 degrees.

For the printing of a non-turned character, the flow is diverged from the block 262 in FIG. 9 to the block 264 in FIG. 10A. In the block 264, the FPA corrector 36, the dot row counter 40 and the edit counter 52 are respectively set to "0", "1" and "240" and other sections are set to "No Turn" for initialization of the operation. The CPU 238 reads the first space data out of the space data buffer 74 (FIG. 1) within the RAM 242 and sets the data in the space counter 70 (FIG. 2B) within the RAM at block 268. In this arrangement, it is to be noted that all other counters, buffers and memory sections are provided within the RAM 242 and that the individual sections are shown only by their designations and numerals.

Figure 10B:
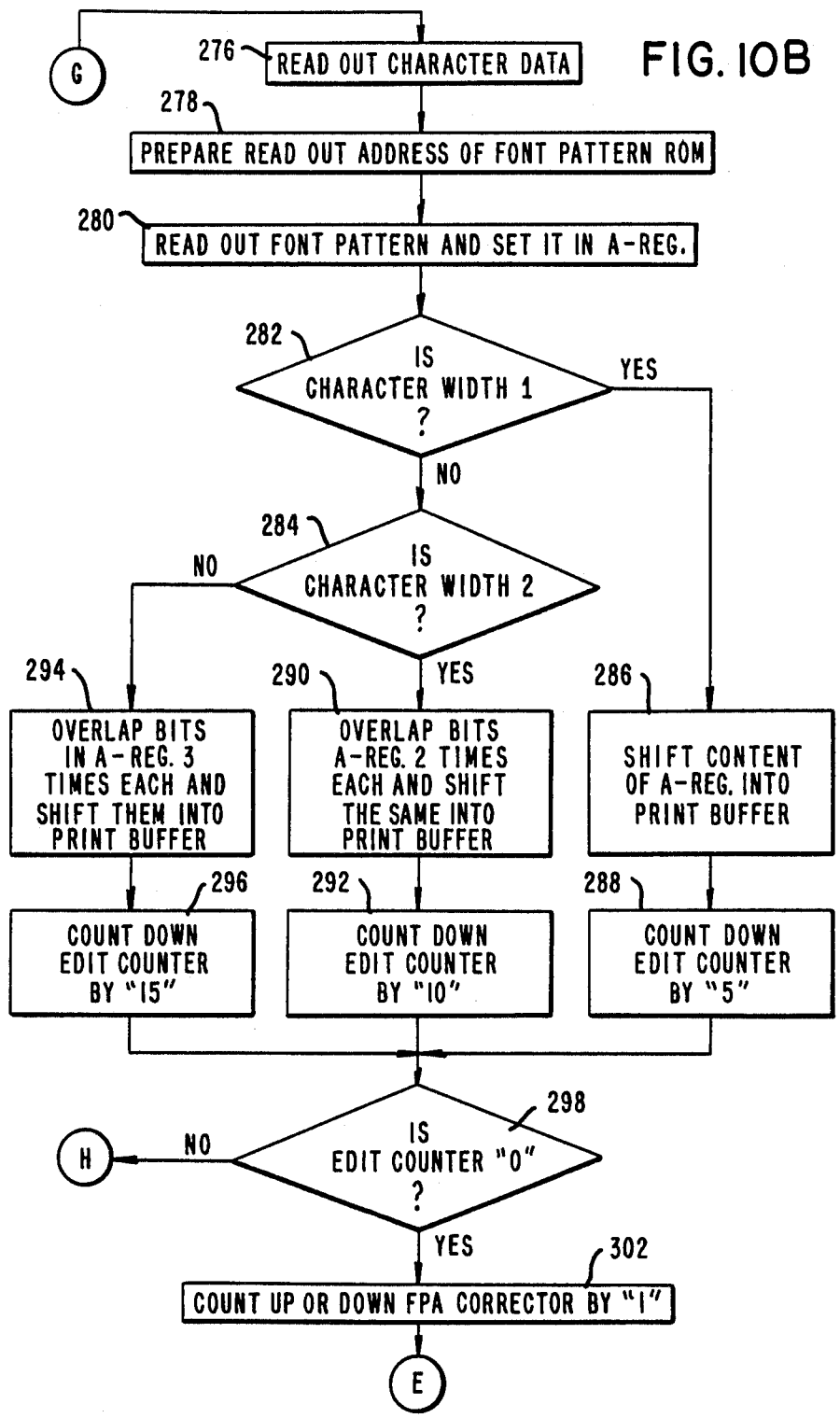

The space data set in the space counter 70 (FIG. 2B) is checked to see whether or not it is set at "0" (block 270). If not, the space data is counted down by "1" and one space dot "0" is shifted into the print data buffer 60 (block 272). The edit counter 52 (FIG. 2B) is counted down by "1" (block 274) to again check and see whether the space counter 70 is counted down to "0" (block 270). The same procedure is repeated until the space counter 70 is counted down to "0" and when such counter is reduced to "0", font data is read out of the character data buffer 68 (block 276 in FIG. 10B) to prepare a read-out address of the font pattern ROM 48 (FIG. 3A) based on the data thus read out and on a value of the FPA corrector 36 (block 278). The font pattern ROM 48 may be provided in the ROM 240, the RAM 242 or any other dedicated memory device. The read-out address of the font pattern ROM 48 is prepared by shifting the character data thus read out to the left by 3 bits and sending the value "0" of the FPA corrector 36 (FIG. 2A) to the lower 3 bits thus vacated. More specifically, with respect to the character "0" in the font pattern ROM 48 (FIG. 3A), the address 1800, which is the first dot row of the character of interest, is read out.

The first dot row read out of the font pattern ROM 48 based on the data thus prepared in the block 278 (FIG. 10B) is input into the A register 98 (block 280) and then is diverged in accordance with the value of the character width signal (blocks 282 and 284). If the character width signal is "1", the content of the A register 98 is shifted into the print data buffer 60 (FIG. 1) one bit at a time (block 286) from the one side of column a and the edit counter 52 (FIG. 2B) is counted down by the number corresponding to one dot row (block 288), that is, a count of "5". If the character width signal is "2", the individual dot pattern bits stored in the A register 98 (FIG. 3A) are overlapped two times each bit and are shifted into the print data buffer 60 (block 290). Since 5 dot pattern bits are stored in the A register 98, 10 bits are input into the print data buffer 60 (FIG. 1) and hence the edit counter 52 (FIG. 2B) is counted down by "10" (block 292). If the character width signal is "3", the individual bits are overlapped three times each and are input into the print data buffer 60 (block 294) in the same manner as above, and the edit counter 52 is counted down by "15" (block 296).

A check is made to see whether the edit counter 52 (FIG. 2B) is counted down to "0" (block 298), and if not, the read out addresses of the character data buffer 68 and the space data buffer 74 (FIG. 1) are shifted up by "1" (block 300 in FIG. 10A). Next, in the block 268, the second space data is read out and the space dot "0" is shifted into the print data buffer 60, as in the case of the first space data (blocks 270, 272 and 274). Upon completion of the second space dot shifting, the second font data is read out (block 276 in FIG. 10B), the dot row pattern data are read out of the font pattern ROM 48 (FIG. 3A) in the same manner as above (blocks 278 and 280), and the second dot row pattern data is shifted into the print data buffer 60. The above procedure is repeated until the edit counter 52 is counted down to "0", indicating that the editing of one line dot row is finished. When the edit counter 52 is reduced to "0" (block 298), the content of the FPA corrector 36 (FIG. 2A) is shifted up by 1 in the block 302 and the flow is diverged into E in FIG. 12 to print one line dot row.

When the edit counter 52 (FIG. 2B) is counted down to "0", the CPU 238 sends a signal to the carriage driving means 246 through the output port 250 to drive the carriage, by which the print shift CLK signal 146 (FIG. 3C) is output from the dot position sensor 140 and fetched into the CPU 238 through the input port 252. In the CPU 238, the print data buffer 60 (FIG. 1) is shifted in synchronism with the print shift CLK (block 304 in FIG. 12), wherein data shifted out of the print data buffer 60 is output to the solenoid driver 138 through the output port 250 for printing operation (block 306). In the case wherein four print heads are provided, as shown in the embodiment of FIG. 3C, four print data are simultaneously shifted out one bit at a time from the shift registers 130 to 136, are simultaneously input in parallel into the four solenoid drivers 138 (only one solenoid driver being shown in FIG. 8), and are simultaneously printed. The above mentioned shifting-out and printing operations are repeated to print all the data in the print data buffer 60 (FIG. 1), which is all the data in one line dot row (block 308 in FIG. 12), and then is checked to see whether the printing of all line dot rows (seven line dot rows in the case of the non-turned character), such being the printing of one character line, is completed (block 310). At this time, the printing of only the first line dot row is completed, so that the flow is advanced to block 312 in which the dot row counter 40 (FIG. 2A) is counted up by "1" and then the individual devices other than the dot row counter 40 and the FPA corrector 36 are again initialized in an arrangement, for example, wherein the edit counter 52 (FIG. 2B) is set to "240" (block 314).

Figure 12:
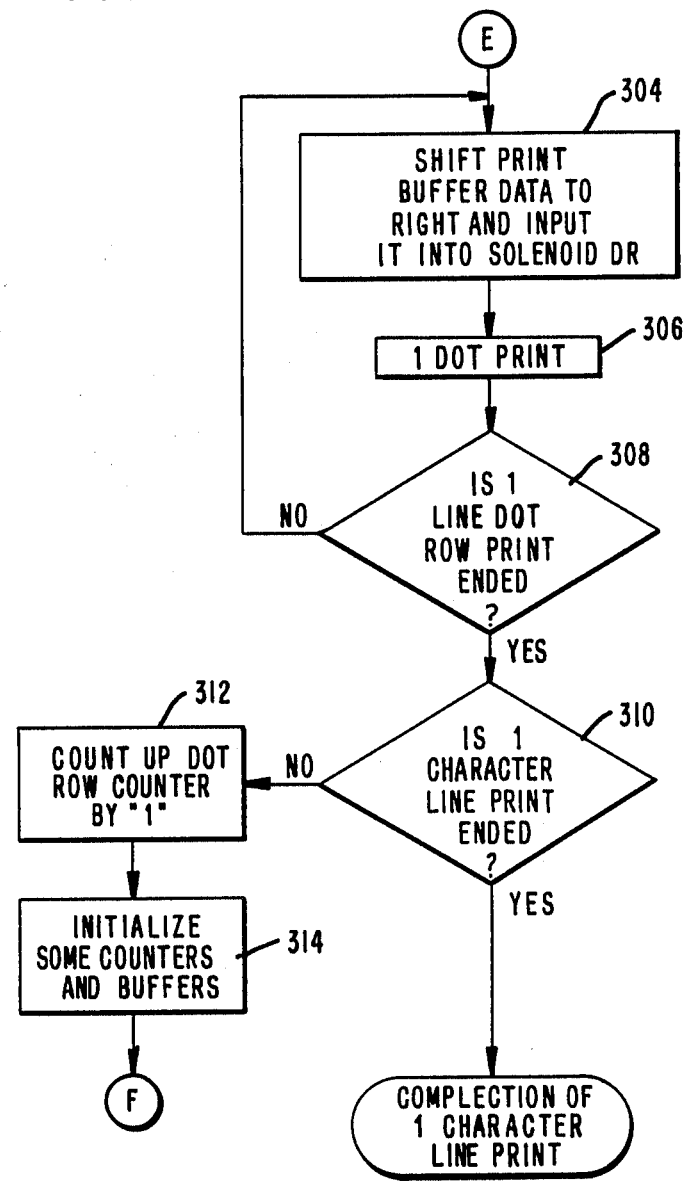
FIG. 12 is a flow chart showing a control program for printing a character line.

Thereafter, the flow re-enters the block 268 from F in FIG. 10A to perform the editing and printing of the second line dot row. The space dots and font pattern are sequentially input into the print data buffer 60 (FIG. 1) in the same manner as the first line dot row. However, the second line differs from the first line in that the FPA corrector 36 (FIG. 2A) is counted up to "1" in the block 302 (FIG. 10B) so that the address to be read out of the font pattern ROM 48 (block 278) moves to the address 1801 or to the second dot row (FIG. 3A). When seven line dot rows are completely printed, the printing of one character line is finished, so that the printing is finished in the block 310 (FIG. 12). Upon completion of the printing, the CPU 238 (FIG. 8) sends a request signal 254 to the POS terminal through the output port 250 and the interface 248 to await the transmission of data for the next character line.

(iii) 180° Turned Character

In order to print a 180° turned character, the flow is moved from the block 266 in FIG. 9 to the block 316 in FIG. 10A, wherein the FPA corrector 36, the dot row counter 40, and the edit counter 52 (FIGS. 2A and 2B) are set to "6", "1" and "240", respectively.

In the blocks following the block 316 (FIG. 10A), the space dots and font pattern dots are shifted into the print data buffer 60 (FIG. 1) in the same manner as those of the non-turned character. However, the FPA corrector 36 initially is set to "6" and then is counted down in the block 302 (FIG. 10B), so that the reading for the 180° turned character is performed in the reverse order of the printing of the non-turned character in the manner of counting from the address 1806 down to the address 1800 (FIG. 3A) each time a line dot row is shifted. As described above, the dot rows are read out in the reverse order of those in the non-turned character printing operation and are shifted into the print data buffer 60 one bit at a time from the side of column e, and the 180° turned character is printed.

(iv) 90° Turned Character

Figure 11A:
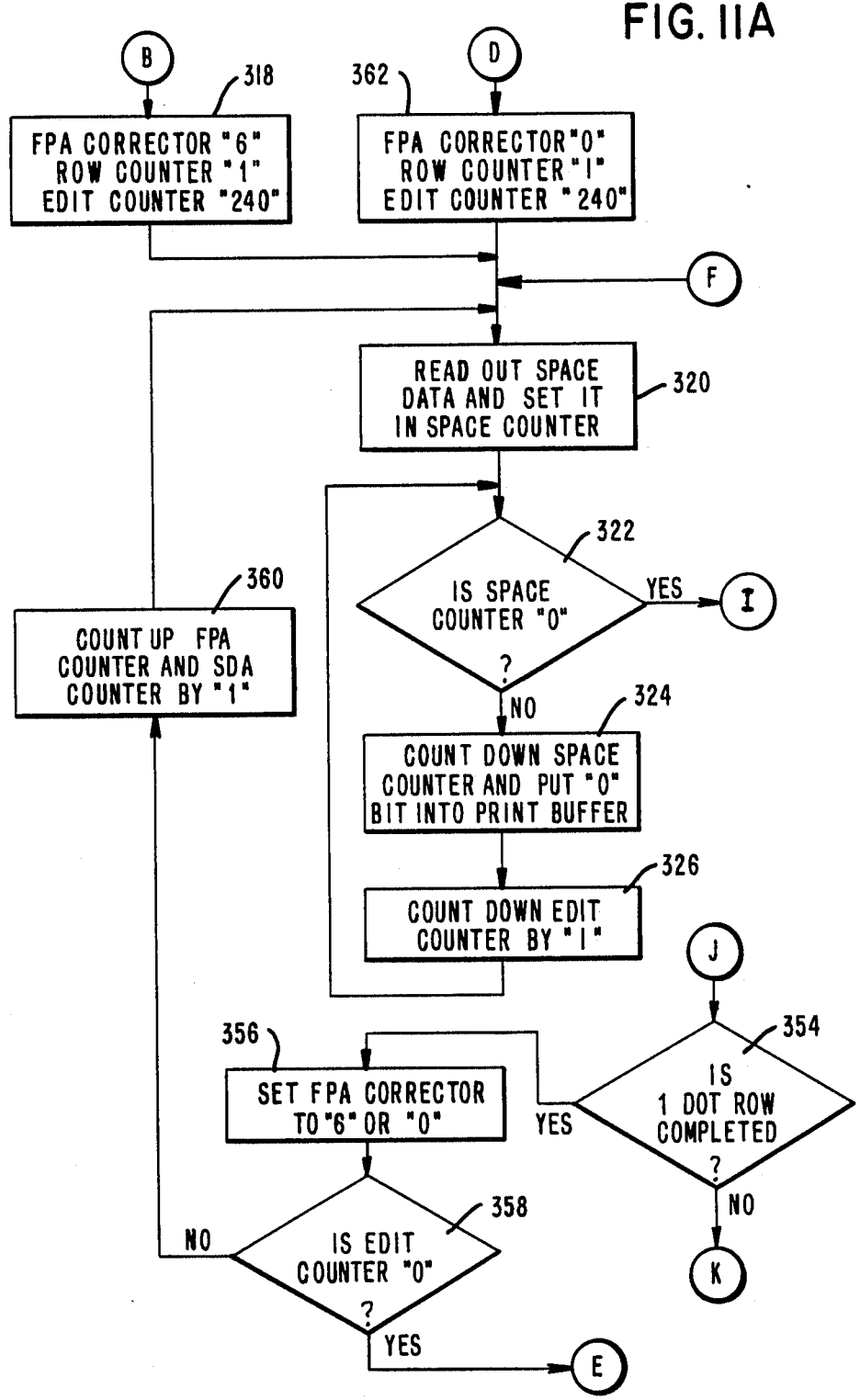
FIGS. 11A and 11B constitute a flow chart showing a control program for the character turned at or through 90 degrees.

In the case wherein a 90° clockwise turned character is to be printed, the flow is diverged from the block 264 in FIG. 9 to B at block 318 in FIG. 11A. In the block 318, the FPA corrector 36, the dot row counter 40, and the edit counter 52 (FIGS. 2A and 2B) are set to "6", "1" and "240", respectively, and the remaining sections are initialized in conformity with the "90° turn". As in the case of the non-turned character, the space data are read out (block 320) and the space dots are shifted into the print data buffer 60 (FIG. 1) in accordance with the space data thus read out, as shown in blocks 322, 324 and 326. The first font data is read out of the character data buffer 68 (block 328 in FIG. 11B) and a read-out address of the font pattern ROM 48 (FIG. 3A) is prepared (block 330) in the same manner as the 180° turned character. The FPA corrector 36 is set to "6", wherein a pattern data is read out of the address 1806 (FIG. 3A) and is set in the A register 98 (block 332). Only the bits of the number required for the first dot row of the 90° turned character are selected from the data thus read out (block 334). The bits are selected by causing the values 1 to 5 of the dot row counter 40 (FIG. 2A) to correspond to the columns "a" to "e" of the font pattern ROM 48 (FIG. 3A). The dot row counter 40 is set to "1", and the bits corresponding to the "a" column of the address 1806 are selected.

The flow of the data is diverged in accordance with the character width (blocks 336 and 338). In the case wherein the character width is "1", one bit thus selected is shifted into the print data buffer 60 (FIG. 1) and the edit counter 52 (FIG. 2B) is counted down by "1" (blocks 340 and 342). In the case wherein the character width is "2", the selected bit is shifted two times into the print data buffer 60 and the edit counter 52 is counted down by "2" (blocks 344 and 346). In the case wherein the character width is "3", the selected bit is shifted into the print data buffer three times and the edit counter is counted down by "3" (blocks 348 and 350). The value of the FPA correcter 36 (FIG. 2A) is shifted down by "1" (block 352) and the FPA corrector is checked to see whether input of the selected bit for one dot row into the print data buffer 60 is completed (block 354 in FIG. 11A). At this time, only the address 1806 (FIG. 3A) is processed, so that the "a" column bits from the addresses 1805 to 1800 are input into the print data buffer 60. The FPA corrector 36 is reset to "6" and it is checked to see whether the edit counter 52 is counted down to "0" to determine whether the editing for one line dot row is finished (blocks 356 and 358).

At this time, only the first dot row of the first character is input into the print data buffer 60 (FIG. 1), so that the address counters for reading the character data buffer 68 and the space data buffer 74 (FIG. 1) are shifted up by "1" (block 360) to return to the block 320.

After that, the second and succeeding space dots and font pattern dots are shifted into the print data buffer 60 in the same manner as above and the flow is diverted to E at block 304 in FIG. 12 when the edit counter 52 is reduced to "0".

After one line dot row printing is performed in the same manner as that for the non-turned character, the flow returns to F in FIG. 12 in order to edit the second line dot row. The editing of the second line dot row is performed in the same manner as that of the first line dot row. However, the dot row counter 40 (FIG. 2A) is set to "2", so that bits corresponding to the "b" column of the font pattern ROM 48 (FIG. 3A) are selected from the data read out of the font pattern ROM.

The same operation is repeated to complete the printing of the fifth line dot row, wherein the printing of the 90° turned character is completed in the block 310 in FIG. 12.

(v) 270° Turned Character

The 270° turned character is printed basically in the same manner as the 90° turned character. However, in this case the flow is diverted from the block 266 in FIG. 9 to D at block 362 in FIG. 11A. The FPA corrector 36 (FIG. 2A) is set to "0" in the blocks 362 and 356 in FIG.

Figure 11B:
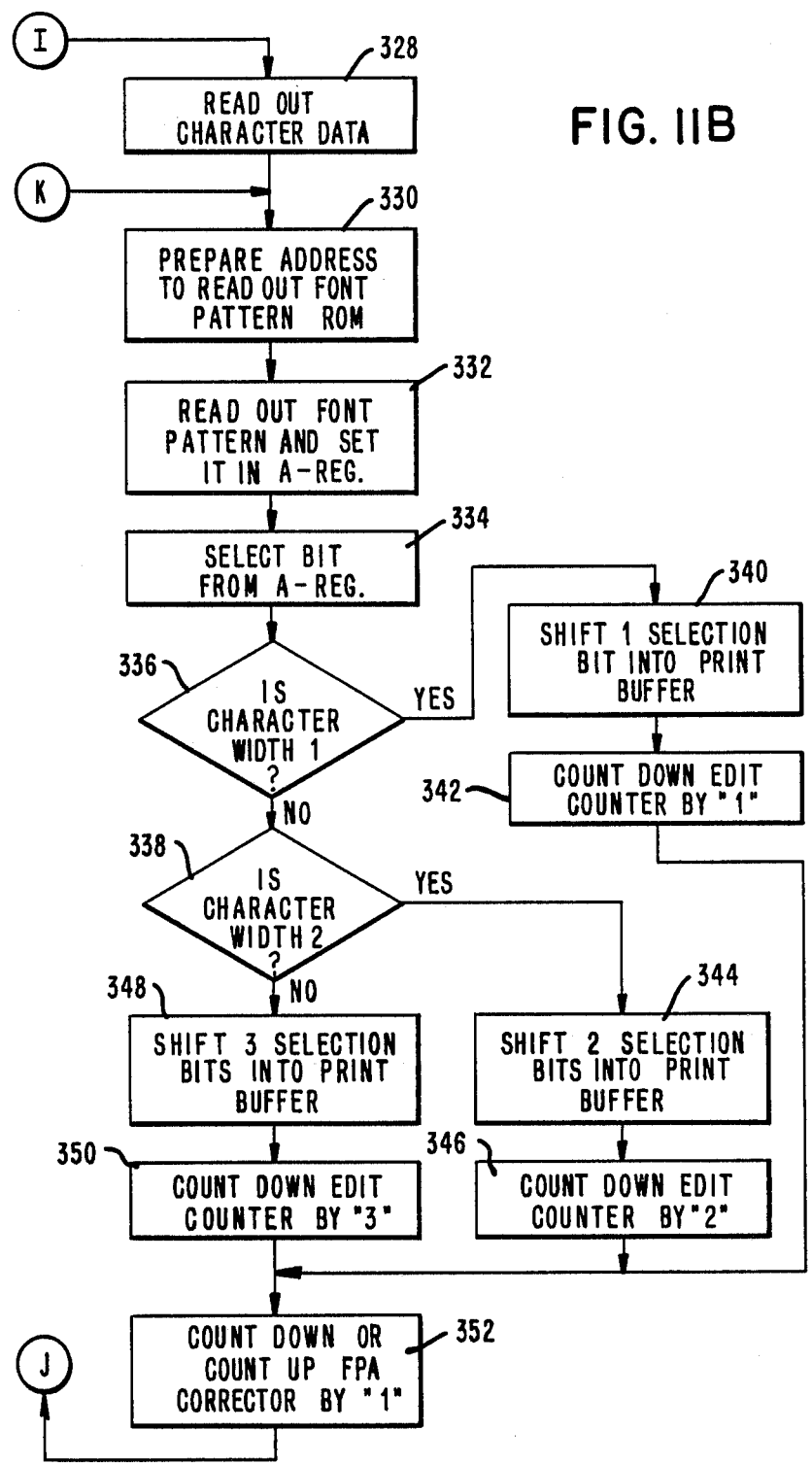

11A and the value of the FPA corrector 36 (FIG. 2A) is shifted up in the block 352 in FIG. 11B. Accordingly, the data first is read out of the address 1800 of the font pattern ROM 48 (FIG. 3A). In addition, as contrasted with the 90° turned character, the "e" column bits of the font pattern ROM 48 should be selected as the first dot row, so that in the block 334 in FIG. 11B, it is necessary to employ the figure which is the addition of "1" to the complement of base "5" for the data in dot row counter 40 (FIG. 2A) for the bit selection. In the case of the first line dot row being edited and wherein the value of the dot row counter is "1", the figure used is "5" (the addition of 1 and 4) which is the complement of base "5" for the "1". The fifth bit from the left on the A register 98 (FIG. 3A) (column e) is selected.

In other respects, the 270° turned character is printed in the same manner as that of the 90° turned character.

Although the above description of the embodiment of the present invention does not touch on the printing of a character which is elongated in the longitudinal direction, as is illustrated in FIG. 6C, the character elongation in such direction can be readily realized by constructing the printer so as to print individual line dot rows by overlapping the rows two or three times each and such construction falls within the intent and scope of the present invention.

OPERATION OF THE INVENTION

In a summary of the operation of the present invention, the terms used herein are defined relative to the illustrations in FIGS. 6A, 6B and 6C. FIG. 6A illustrates a dot pattern of the numeral "0" in the standard orientation thereof and FIG. 6B shows the state wherein the dot pattern in FIG. 6A is turned clockwise by 90°. In both cases shown in FIGS. 6A and 6B, a group of dots horizontally arranged is called a "row" and a group of dots vertically arranged is called a "column". Also, a horizontal arrangement of dots in one character is called a "dot row" and a vertical arrangement of dots in one character is called a "dot column". Accordingly, the pattern shown in FIG. 6A is constituted by seven dot rows and five dot columns and the pattern shown in FIG. 6B is constituted by five dot rows and seven dot columns.

It is assumed that one line is constituted by printing 40 characters such as shown in FIG. 6A. Also, it is assumed that space for one dot is provided before the first character and each space between characters is provided for one dot, (5+1)×40=240, which means that a length corresponding to 240 dots is needed in the horizontal direction. A group of dots arranged horizontally in one line (240 dots) is called "one line dot row" and a set of characters constituting one line (40 characters and spaces) is called "one character line". Accordingly, in order to print one character line, seven sets of one line dot rows consisting of 240 dots or seven line dot rows must be arranged in the vertical direction, and 240 sets of dot columns each consisting of seven dots are arranged in the horizontal direction.

When the character data and space data are sent from the POS terminal and are stored in the character data buffer 68 and in the space data buffer 74, respectively, (FIG. 1) an address signal 82 is sent from the edit controller 20 to the space data buffer 74. The first space data 80 is read out of an address "0" in the space data buffer 74 (FIG. 3B) and is sent to the edit controller 20. The edit controller 20 receives the space data and sends the space dot "0"s, as signal 162, to the character and space synthesizer 64 (FIG. 1) in accordance with the number specified by the space data 80. The space dot "0"s received by the character and space synthesizer 64 are sent by the signal 65 to the print data buffer 60 and are stored therein.

When the number of space dot "0"s, as specified by the first space data 80, are stored in the print data buffer 60 (FIG. 1), the address signal 200 is sent from the edit controller 20 to the character data buffer 68, and the first character data is read out therefrom and is sent to the address generator 46. The generator 46 addresses the font pattern ROM 48 in accordance with the character data thus read out from the character data buffer 68 and an address correction signal 44 is sent from the edit controller 20 to read out the dot pattern of the first character. The dot pattern thus read out from the font pattern ROM 48 is sent to the font pattern processor 56 wherein the arrangement of the character dot pattern is edited or changed in accordance with the control signal 54 from the edit controller 20 so that the character is printed after being turned in direction and elongated or broadened in width. Upon completion of the modification of the dot pattern in the font pattern processor 56, the dot pattern thus processed is sent to the character and space synthesizer 64, which outputs the character dot pattern received from the font pattern processor 56 to the print data buffer 60.

When the dot pattern data of the first character processed in the font pattern processor 56 is input into the print data buffer 60 (FIG. 1), the address signal 82 is again sent from the edit controller 20 to the space data buffer 74 to read out a second space data. As in the case of the first space data 80, the number of space dot "0"s specified by the second space data are input into the print data buffer 60.

When the number of space dot "0"s as specified by the second space data are input into the print data buffer 60, the address signal 200 is again sent from the edit controller 20 to the character data buffer 68 from which a second character data is read and the character dot pattern is input into the print data buffer 60 in the same manner as described above.

Thereafter, the same procedure is repeated until the data stored in the character data buffer 68 and in the space data buffer 74 (FIG. 1) (or other specific data) are read out. When the character data and the space data are cleared, (or the specific data are read out) and the editing of all the dot data for one character line is finished (or the printing thereof is completed), the data request signal 217 is sent from the request controller 144 to the POS terminal (FIG. 1) for additional data.

It is thus seen that herein shown and described is a dot matrix printer useful in the case wherein a slip or like document, that is wider (or longer) in the lateral direction than is the print station, can be printed by turning the slip by 90° or 270°. The position and size of the space between the character dots is adjusted in accordance with the turning angle of the character to accomplish printing on the slip that is wider than the print station. The character data and the space data can be processed separately so that space size can be fixed regardless of the character width and the spaces can remain at minimum one-dot intervals. Printing of the characters is initiated after editing of one line dot row in a manner wherein the character turning and printing of the elongated or broadened characters is realized. The mechanism and arrangement enable the accomplishment of the objectives and advantages mentioned above, and while a preferred embodiment and a modification of the invention have been disclosed herein, other variations thereof may occur to those skilled in the art. It is contemplated that all such variations not departing from the spirit and scope of the invention hereof are to be construed in accordance with the following claims.

What is claimed is:

1. A dot matrix printer comprising:
font pattern memory means,
means for receiving character print data and means for receiving character space data to enable printing of characters in dot matrix manner along a line on record media,
font pattern processing means coupled with the means for receiving the character print data and the means for receiving character space data for changing the arrangement of the font pattern,
means for addressing the font patter memory means coupled with the means for receiving the character print data and with the font pattern processing means for reading the font pattern of characters to be printed,
space data generating means responsive to the changed arrangement of the font pattern for providing space signals before and after the output of font pattern data from said font pattern processing means in accordance with character width and with space data indicative of space between characters to be printed,
means for controlling the font pattern processing means coupled with the font pattern memory means and for controlling the space data generating means in accordance with signals received for printing of the character data and the space data, and
means for printing dot matrix characters along said line in an orientation normal to the font pattern initially received in said font pattern memory means.

2. The dot matrix printer of claim 1 wherein the font pattern memory means comprises a read only memory.

3. The dot matrix printer of claim 1 wherein the means for receiving character print data and the means for receiving character space data are buffers coupled to the font pattern processing means.

4. The dot matrix printer of claim 1 wherein the font pattern processing means comprises a font pattern processor for changing orientation of the dot matrix font pattern to enable printing at 90° or 270° from the font pattern initially received.

5. The dot matrix printer of claim 1 wherein the means for addressing the memory means comprises an address generator coupled to the means for receiving character print data and the font pattern memory means.

6. The dot matrix printer of claim 1 wherein the means for controlling the processing means comprises a character and space synthesizer coupled to the font pattern processing means.

7. The dot matrix printer of claim 1 wherein the space data generating means comprises an editing controller including a dot row counter and a dot column counter for confirming row and column data depending upon orientation of the characters to be printed.

8. The dot matrix printer of claim 1 including a print data buffer for continuing data and coupled to said means for controlling the processing means.

9. The dot matrix printer of claim 1 including print solenoid driver means for affecting printing of said dot matrix characters.

10. The dot matrix printer of claim 1 including a print controller and a dot position sensor coupled to said space data generating means.

* * * * *